US012600603B2

(12) United States Patent
Minami

(10) Patent No.: US 12,600,603 B2
(45) Date of Patent: Apr. 14, 2026

(54) CRANE, CRANE CHARACTERISTIC CHANGE DETERMINATION DEVICE, AND CRANE CHARACTERISTIC CHANGE DETERMINATION SYSTEM

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 266 days.

(21) Appl. No.: 18/030,209

(22) PCT Filed: Oct. 19, 2021

(86) PCT No.: PCT/JP2021/038577
§ 371 (c)(1),
(2) Date: Apr. 4, 2023

(87) PCT Pub. No.: WO2022/085675
PCT Pub. Date: Apr. 28, 2022

(65) Prior Publication Data

US 2023/0373761 A1 Nov. 23, 2023

(30) Foreign Application Priority Data

Oct. 21, 2020 (JP) ................................ 2020-176963

(51) Int. Cl.
*B66C 13/48* (2006.01)
*B66C 13/06* (2006.01)
(Continued)

(52) U.S. Cl.
CPC ............ *B66C 13/48* (2013.01); *B66C 13/063* (2013.01); *B66C 15/06* (2013.01); *B66C 23/42* (2013.01)

(58) Field of Classification Search
CPC ....... B66C 13/48; B66C 13/063; B66C 15/06; B66C 23/42; B66C 13/46; B66C 13/40
See application file for complete search history.

(56) References Cited

U.S. PATENT DOCUMENTS

2020/0293028 A1* 9/2020 Tadano .................. G06Q 50/04
2021/0284507 A1 9/2021 Minami

FOREIGN PATENT DOCUMENTS

CN 108190751 A 6/2018
JP 2004-189396 A 7/2004
(Continued)

OTHER PUBLICATIONS

Dec. 28, 2021, International Search Report issued for related PCT Application No. PCT/JP2021/038577.
(Continued)

*Primary Examiner* — Scott A Browne
*Assistant Examiner* — Nazia Afrin
(74) *Attorney, Agent, or Firm* — Paratus Law Group, PLLC

(57) ABSTRACT

This crane is capable of transporting cargo and includes: a feedback control unit for feedback control of the crane or an object to be controlled that is a component of the crane; a learning model that has a weighting factor and learns the characteristics of the object to be controlled in real time by adjusting the weighting factor on the basis of a teacher signal including a first signal generated by the feedback control unit; and a communication control unit that transmits the weighting factor to an external device that is communicatively connected to the crane.

8 Claims, 12 Drawing Sheets

(51) Int. Cl.
*B66C 15/06* (2006.01)
*B66C 23/42* (2006.01)

(56) References Cited

FOREIGN PATENT DOCUMENTS

| | | | | | |
|---|---|---|---|---|---|
| JP | 2018-062414 | A | | 4/2018 | |
| JP | 2018-172208 | A | | 11/2018 | |
| JP | 2020015589 | A | * | 1/2020 | ............. B66C 23/88 |
| JP | 2020066333 | A | * | 4/2020 | ............ B60W 50/14 |
| JP | 2020152532 | A | * | 9/2020 | |

OTHER PUBLICATIONS

Dec. 28, 2021, International Search Opinion issued for related PCT Application No. PCT/JP2021/038577.

* cited by examiner

CRANE, CRANE CHARACTERISTIC CHANGE DETERMINATION DEVICE, AND CRANE CHARACTERISTIC CHANGE DETERMINATION SYSTEM

CROSS REFERENCE TO PRIOR APPLICATION

This application is a National Stage Patent Application of PCT International Patent Application No. PCT/JP2021/038577 (filed on Oct. 19, 2021) under 35 U.S.C. § 371, which claims priority to Japanese Patent Application No. 2020-176963 (filed on Oct. 21, 2020), which are all hereby incorporated by reference in their entirety.

TECHNICAL FIELD

The present invention relates to a crane, a crane characteristic change determination device, and a crane characteristic determination system.

BACKGROUND ART

Conventionally, a crane used for cargo transport work has been known (see Patent Literature 1). Such a crane includes a vehicle, a boom, a hook, and the like.

The boom is supported to be slewable with respect to the vehicle. Further, the boom is capable of derricking and telescoping. The hook is suspended from a distal end portion of the boom via a wire rope.

The operator can instruct the moving direction and the moving velocity of the boom or the hook by operating an operation unit or a remote manipulator.

CITATION LIST

Patent Literature

Patent Literature 1: JP 2018-62414 A

SUMMARY OF THE INVENTION

Problems to be Solved by the Invention

In the crane as described above, the boom, the wire rope, and the hook are driven by an actuator. When the operator operates the operation unit or the remote manipulator, a command signal corresponding to the operation amount or the operation direction by the operator is delivered to a control unit. The control unit drives the actuator, which is an object to be controlled, in accordance with the received command signal.

Each actuator described above has predetermined characteristics. These characteristics are unique to the actuator and usually do not change. However, when the crane is used for a long period of time, there is a possibility that the actuator deteriorates over time, and the characteristics of the actuator change.

Further, also when a failure occurs in the actuator or a configuration (for example, a hydraulic circuit) that affects the operation of the actuator, there is a possibility that the characteristics of the actuator change. It is not preferable to continue to use the crane without noticing such a change in the characteristics of the actuator from the viewpoint of operability and safety of the crane.

An object of the present invention is to provide a crane capable of recognizing a change in characteristics of the crane, a crane characteristic change determination device, and a crane characteristic change determination system.

Solutions to Problems

An aspect of a crane according to the present invention is a crane capable of transporting cargo, the crane including:

a feedback control unit that performs feedback control of the crane or an object to be controlled that is a component of the crane;

a learning model that has a weighting factor and learns characteristics of the object to be controlled in real time by adjusting the weighting factor on the basis of a teacher signal including a first signal generated by the feedback control unit; and a communication control unit that transmits the weighting factor to an external device that is communicatively connected to the crane.

An aspect of a crane characteristic change determination device according to the present invention is a crane characteristic change determination device communicatively connected to a crane including: a feedback control unit that performs feedback control of the crane or an object to be controlled that is a component of the crane, and a learning model that has a weighting factor and learns characteristics of the object to be controlled in real time by adjusting the weighting factor on the basis of a teacher signal including a first signal generated by the feedback control unit, the crane characteristic change determination device including:

an acquisition unit that acquires the weighting factor from the crane; and a control unit that performs calculation using the weighting factor acquired from the acquisition unit.

An aspect of a crane characteristic change determination system according to the present invention includes:

a crane; and a characteristic change determination device that is communicatively connected to the crane, the crane including:

a feedback control unit that performs feedback control of the crane or an object to be controlled that is a component of the crane, and a learning model that has a weighting factor and learns characteristics of the object to be controlled in real time by adjusting the weighting factor on the basis of a teacher signal including a first signal generated by the feedback control unit, in which the crane transmits a weighting factor of the learning model to the characteristic change determination device, and the characteristic change determination device determines a change in the characteristics of the object to be controlled on the basis of the weighting factor acquired from the crane, and outputs a determination result.

Effects of the Invention

According to the present invention, it is possible to achieve a crane capable of recognizing a change in characteristics of the crane, a crane characteristic change determination device, and a crane characteristic change determination system.

DESCRIPTION OF EMBODIMENTS

Figure 1:
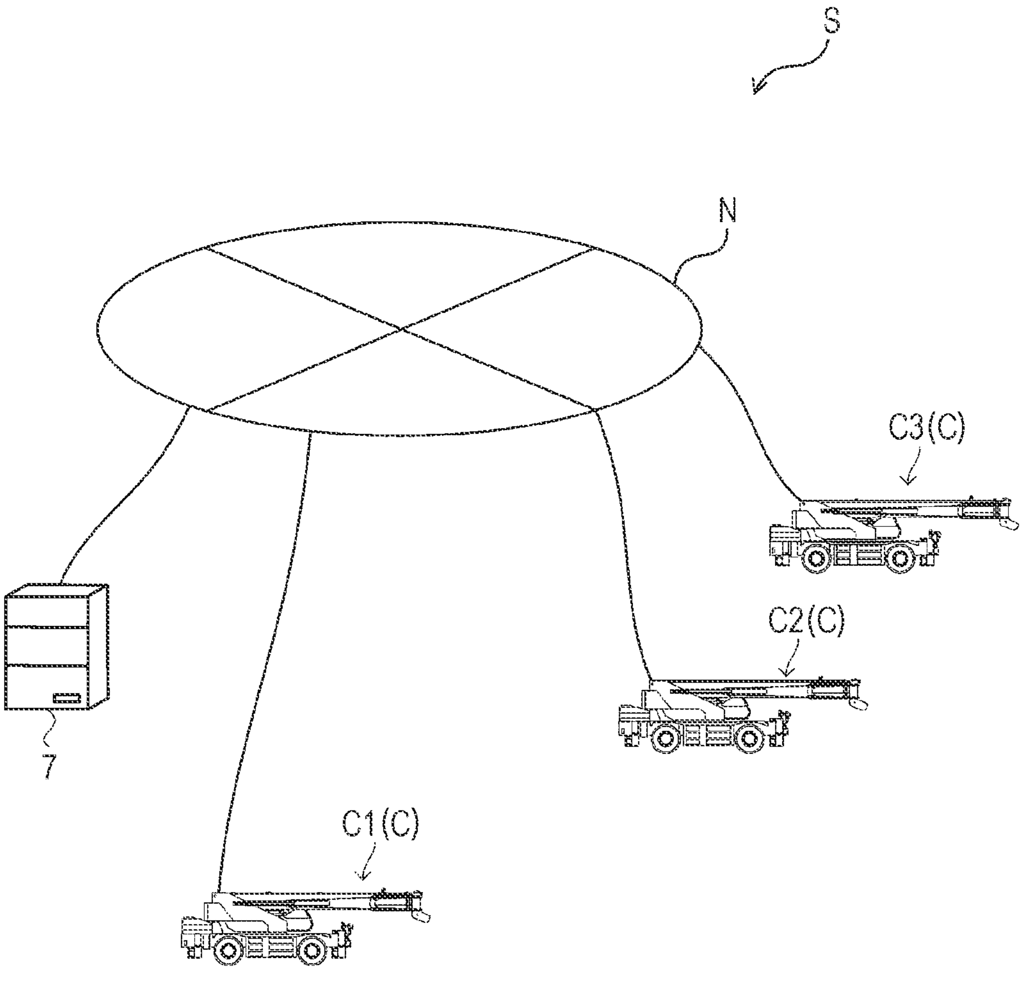
FIG. 1 is a diagram illustrating a configuration of a crane characteristic change determination system according to an embodiment.
Figure 2:
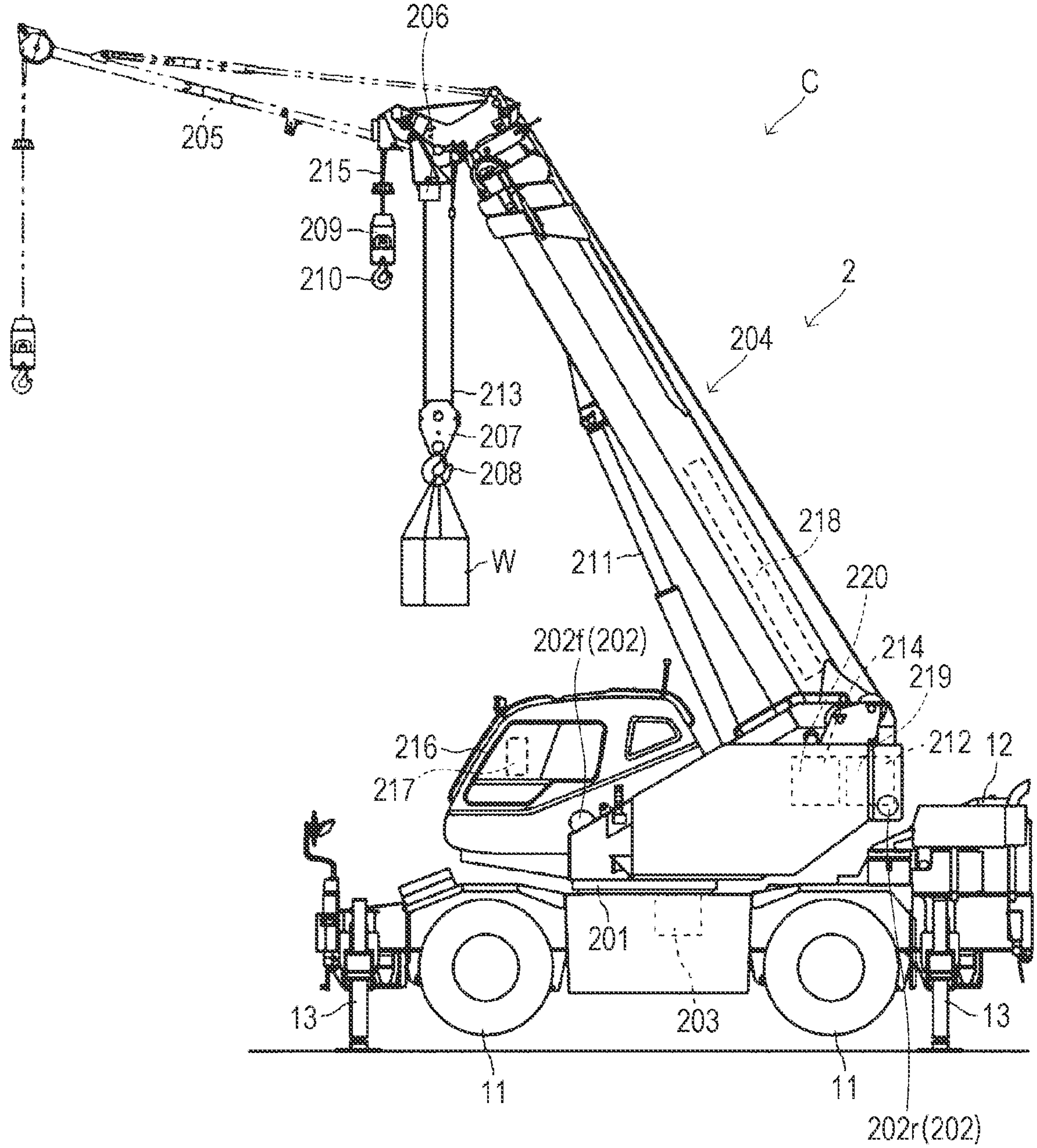
FIG. 2 is a side diagram of a crane.

Hereinafter, an embodiment according to the present invention will be described in detail on the basis of the drawings. Note that a crane C, a crane characteristic change determination device 7, and a crane characteristic change determination system S according to the embodiment described below are examples of the crane, the crane characteristic change determination device, and the crane characteristic change determination system according to the present invention, and the present invention is not limited to the embodiment described below.

Embodiment

The crane C, the crane characteristic change determination device 7, and the crane characteristic change determination system S according to the embodiment of the present invention will be described with reference to FIGS. 1 to 13. Hereinafter, an outline of the characteristic change determination system S will be described, and then structures of the crane C and the characteristic change determination device 7 included in the characteristic change determination system S will be described. Note that the characteristic change determination system S according to the present invention may include all configurations to be described below, or may not include some configurations.

(Characteristic Change Determination System)

First, an outline of the characteristic change determination system S will be described. For example, at a building site, the crane C is used to perform transport of cargo W (for example, building material). The operator of the crane C operates the crane C by operating an operation tool or an operation terminal during the transport work. An operation terminal 3 may be provided in a cabin 216 of the crane C, or may be a remote operation terminal wirelessly connected to the crane C.

The crane C transports the cargo W by changing the pose of a boom 204 and/or the unwinding amount of a wire rope (main wire rope 213 or sub-wire rope 215) on the basis of an instruction from the operator. Note that the crane C may operate on the basis of, for example, a preset program instead of an instruction from the operator.

The crane C includes, for example, an actuator for changing the pose of the boom 204 and an actuator for changing the unwinding amount of the wire rope. These actuators are driven under the control of a control unit 29 (control system 42). Thus, these actuators are objects to be controlled of the control unit 29 (control system 42). Note that the entire crane C can also be regarded as an object to be controlled of the control unit 29 (control system 42).

In the case of the present embodiment, the control unit 29 (control system 42) includes a feedback control unit 42*a* that performs feedback control of the object to be controlled, and a feedforward control unit 42*b* that performs feedforward control of the object to be controlled in cooperation with the feedback control unit 42*a*.

The feedforward control unit 42*b* is a mathematical model including an adjustable weighting factor ωn. The feedforward control unit 42*b* has a function of learning the characteristics of the object to be controlled in real time by adjusting the weighting factor ωn on the basis of a teacher signal including a signal (first signal) generated in the feedback control unit 42*a*. In other words, the feedforward control unit 42*b* has a function of identifying the object to be controlled in real time.

When the learning in the feedforward control unit 42*b* (hereinafter, simply referred to as "learning") is completed, the weighting factor ωn converges to a predetermined value corresponding to the characteristics of the object to be controlled. That is, when the characteristics of the object to be controlled do not change, the weighting factor (in for each learning becomes a constant or substantially constant value in a state where the learning is completed.

Conversely, in a case where the characteristics of the object to be controlled have changed, the weighting factor ωn in a state where the learning is completed is different from a weighting factor before the change in the characteristics of the object to be controlled. That is, the presence or absence of the change in the characteristics of the object to be controlled can be confirmed by viewing the change in the weighting factor in a state where the learning is completed.

Hence, in the case of the embodiment, the crane C has a function of transmitting the weighting factor ωn of the feedforward control unit 42*b* to the characteristic change determination device 7 communicatively connected to the crane C at a predetermined timing.

Then, the characteristic change determination device 7 has a function of determining the presence or absence of a change in the characteristics of the object to be controlled on the basis of the presence or absence of a change in the weighting factor on acquired from the crane C. Hereinafter, a specific configuration of the characteristic change determination system S according to the present embodiment will be described.

As illustrated in FIG. 1, the characteristic change determination system S includes a plurality of cranes C1, C2, and C3 and the characteristic change determination device 7. The characteristic change determination system S has a configuration in which the plurality of cranes C1, C2, and C3 is connected to the characteristic change determination device 7 via a network N. Note that the number of the plurality of cranes C1, C2, and C3 in the characteristic change determination system S is not limited to the illustrated case. The number of cranes in the characteristic change determination system S may be one or two or more. Hereinafter, the cranes C1, C2, and C3 are referred to as the crane C for the sake of convenience.

(Crane)

As illustrated in FIG. 1, the crane C is a mobile crane that can be moved to an unspecified place. The crane C includes a vehicle 1, a crane device 2, and an operation terminal 3 (see FIG. 3).

(Vehicle)

The vehicle 1 is a travelling body that transports the crane device 2. The vehicle 1 has a plurality of wheels 11 and travels using an engine 12 as a power source. The vehicle 1 has outriggers 13 at four corners.

(Crane Device)

The crane device 2 is a work device that lifts the cargo W. The crane device 2 includes a slewing base 201, a slewing base camera 202, a slewing hydraulic motor 203, a boom 204, a boom camera 206, a jib 205, a main hook block 207, and a sub-hook block 209.

Further, the crane device 2 includes a derricking hydraulic cylinder 211, a main winch 212, a main wire rope 213, a sub-winch 214, a sub-wire rope 215, a cabin 216, and an operation unit 217. Further, the crane device 2 includes a storage unit 27, a communication unit 28, and a control unit 29.

(Slewing Base)

The slewing base 201 supports the crane device 2 with respect to the vehicle 1 in a slewable state.

(Slewing Hydraulic Motor)

The slewing hydraulic motor 203 is a hydraulic motor and is provided in the slewing base 201. The slewing hydraulic motor 203 corresponds to an example of the object to be controlled and the actuator. Further, the slewing hydraulic motor 203 also corresponds to an example of the slewing actuator. The slewing hydraulic motor 203 rotates the slewing base 201 in a first rotation direction or a second rotation direction under the control of the control unit 29.

The slewing hydraulic motor 203 is operated by a slewing valve 250 (see FIG. 3), which is an electromagnetic proportional changeover valve, under the control of the control unit 29. The slewing valve 250 controls the flow rate of a hydraulic oil supplied to the slewing hydraulic motor 203 under the control of the control unit 29.

That is, the slewing base 201 is controlled to an arbitrary slewing velocity by the slewing hydraulic motor 203 operated by the slewing valve 250 under the control of the control unit 29. Note that the slewing base 201 is provided with a slewing sensor 260 (see FIG. 3) that detects a slewing angle θZ and/or slewing velocity of the slewing base 201.

(Slewing Base Camera)

The slewing base camera 202 images the periphery of the slewing base 201. The slewing base camera 202 includes a pair of front slewing base cameras **202*f* provided on the front left and right sides of the slewing base 201, and a pair of rear slewing base cameras 202*r* provided on the rear left and right sides of the slewing base 201**.

Further, the pair of front slewing base cameras **202*f* functions as stereo cameras. The pair of front slewing base cameras 202*f*** corresponds to an example of the cargo position detection means that detects information regarding the position of the cargo W suspended by the crane C (hereinafter, simply referred to as "position information of the cargo W").

Note that the cargo position detection means may be the boom camera 206 described below. Further, the cargo position detection means may be a millimeter wave radar, an acceleration sensor, GNSS, or the like.

(Boom)

The boom 204 is a movable strut that supports the wire rope. The boom 204 has a configuration in which a plurality of boom members is combined in a telescopic manner. A proximal end portion of the boom 204 is supported by the slewing base 201 in a swingable state.

The boom 204 extends and retracts by moving each boom member in an axial direction by a telescoping hydraulic cylinder 218 under the control of the control unit 29. The telescoping hydraulic cylinder 218 corresponds to an example of the object to be controlled and the actuator. Further, the telescoping hydraulic cylinder 218 corresponds to an example of the telescoping actuator.

The telescoping hydraulic cylinder 218 is operated by a telescoping valve 251 (see FIG. 3), which is an electromagnetic proportional changeover valve, under the control of the control unit 29. The telescoping valve 251 controls the flow rate of a hydraulic oil supplied to the telescoping hydraulic cylinder 218 under the control of the control unit 29.

Note that the boom 204 is provided with a telescoping sensor 261 that detects information regarding the length of the boom 204 and an orientation sensor 262 that detects information regarding the orientation about the distal end of the boom 204.

(Jib)

The jib 205 is supported by the distal end portion of the boom 204.

(Boom Camera)

The boom camera 206 (see FIG. 3) is configured to be able to image a predetermined region including the cargo W and the periphery of the cargo W from the distal end portion of the boom 204. The boom camera 206 is provided at the distal end portion of the boom 204.

(Main Hook Block and Sub-Hook Block)

Each of the main hook block 207 and the sub-hook block 209 is a suspending tool for suspending the cargo W. The main hook block 207 includes a plurality of hook sheaves around which the main wire rope 213 is wound, and a main hook 208 for suspending the cargo W. The sub-hook block 209 has a sub-hook 210 for suspending the cargo W.

(Derricking Hydraulic Cylinder)

The derricking hydraulic cylinder 211 raises or lowers the boom 204 under the control of the control unit 29. The derricking hydraulic cylinder 211 corresponds to an example of the object to be controlled and the actuator. Further, the derricking hydraulic cylinder 211 also corresponds to an example of the derricking actuator.

The derricking hydraulic cylinder 211 is operated by a derricking valve 252 (see FIG. 3), which is an electromagnetic proportional changeover valve, under the control of the control unit 29. The derricking valve 252 controls the flow rate of a hydraulic oil supplied to the derricking hydraulic cylinder 211 under the control of the control unit 29. Note that the boom 204 is provided with a derricking sensor 263 (see FIG. 3) that detects a derricking angle θx.

(Main Winch and Sub-Winch)

The main winch 212 and the sub-winch 214 wind (wind up) or unwind (wind down) the main wire rope 213 and the sub-wire rope 215, respectively.

The main winch 212 includes a main drum (not illustrated) around which the main wire rope 213 is wound. This main drum rotates on the basis of a driving force of a main drum hydraulic motor 219 under the control of the control unit 29. The main drum hydraulic motor 219 corresponds to an example of the object to be controlled and the actuator. Further, the main drum hydraulic motor 219 also corresponds to an example of the lifting actuator for lifting the main hook 208.

The main drum hydraulic motor 219 is operated by a main drum valve 253 (see FIG. 3), which is an electromagnetic proportional changeover valve, under the control of the control unit 29. The main drum valve 253 controls the flow rate of a hydraulic oil supplied to the main drum hydraulic motor 219 under the control of the control unit 29.

The sub-winch 214 includes a sub-drum (not illustrated) around which the sub-wire rope 215 is wound. This sub-drum rotates on the basis of a driving force of a sub-drum hydraulic motor 220 under the control of the control unit 29. The sub-drum hydraulic motor 220 corresponds to an example of the object to be controlled and the actuator. Further, the sub-drum hydraulic motor 220 also corresponds to an example of the lifting actuator for lifting the sub-hook 210.

The sub-winch 214 is operated by a sub-drum valve 254 (see FIG. 3), which is an electromagnetic proportional changeover valve, under the control of the control unit 29. The sub-drum valve 254 controls the flow rate of a hydraulic oil supplied to the sub-drum hydraulic motor 220 under the control of the control unit 29.

Note that each of the main winch 212 and the sub-winch 214 is provided with a winding sensor 43 (see FIG. 3) that detects the unwinding amount of the main wire rope 213 and the sub-wire rope 215.

(Cabin)

The cabin 216 is mounted on the slewing base 201. The cabin 216 is provided with a cockpit (not illustrated).

(Operation Unit)

The operation unit 217 corresponds to an example of the operation input unit and is provided in the cabin 216. The operation unit 217 includes an operation tool for traveling and operating the vehicle 1 and an operation unit for operating the crane device 2.

Figure 3:
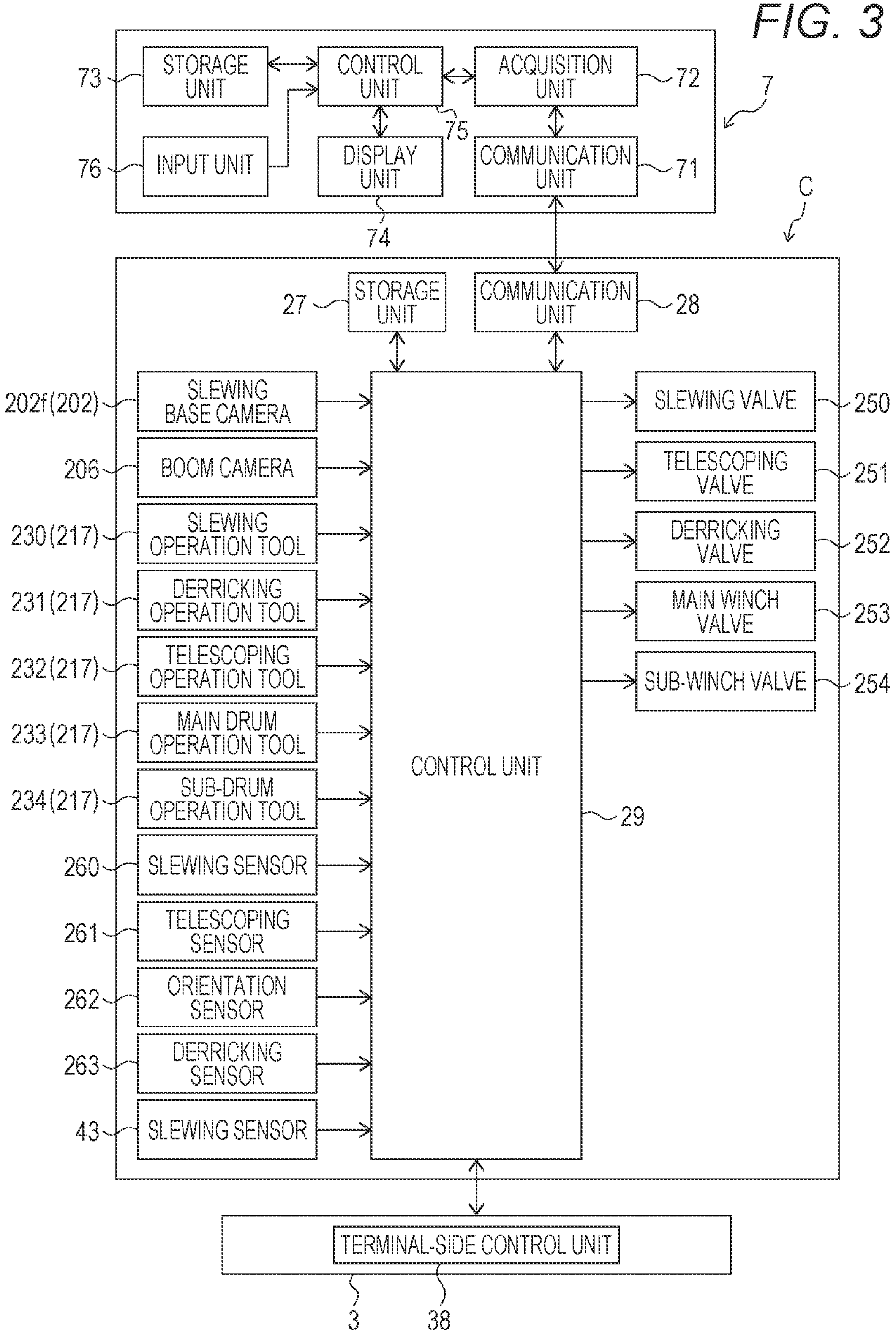
FIG. 3 is a block diagram of a crane characteristic change determination system.

Specifically, the operation unit 217 includes a slewing operation tool 230, a derricking operation tool 231, a telescoping operation tool 232, a main drum operation tool 233, a sub-drum operation tool 234, and the like (see FIG. 3).

The slewing operation tool 230 is an operation tool for the operator to operate the slewing hydraulic motor 203. In other words, the slewing operation tool 230 is an operation tool for the operator to instruct a direction and/or speed related to slewing of the crane device 2.

The derricking operation tool 231 is an operation tool for the operator to operate the derricking hydraulic cylinder 211. In other words, the derricking operation tool 231 is an operation tool for the operator to instruct a direction and/or speed related to derricking of the boom 204.

The telescoping operation tool 232 is an operation tool for the operator to operate the telescoping hydraulic cylinder 218. In other words, the telescoping operation tool 232 is an operation tool for the operator to instruct a direction and/or speed related to telescoping of the boom 204.

The main drum operation tool 233 is an operation tool for the operator to operate the main drum hydraulic motor 219. The main drum operation tool 233 is an operation tool for the operator to instruct a direction and/or speed (that is, moving direction and/or speed of the main hook 208) related to the rotation of the main winch 212.

The sub-drum operation tool 234 is an operation tool for the operator to operate the sub-drum hydraulic motor 220. The sub-drum operation tool 234 is an operation tool for the operator to instruct a direction and/or speed (that is, moving direction and/or speed of the sub-hook 210) related to the rotation of the sub-winch 214.

The operation unit 217 as described above generates an operation signal corresponding to the operation (tilt direction and/or tilt amount) of each operation tool 230 to 234. Then, the operation unit 217 transmits the generated operation signal to the control unit 29 of the crane C (crane device 2). In this case, a target velocity signal generation unit (not illustrated) of the control unit 29 generates a target velocity signal Vd of the cargo W on the basis of the operation signal. That is, the control unit 29 has a function as the target velocity signal generation unit. Note that the operation unit 217 may generate the target velocity signal Vd of the cargo W on the basis of the generated operation signal, and transmit the generated target velocity signal Vd to the control unit 29 of the crane C (crane device 2). In this case, the operation unit 217 also has a function as the target velocity signal generation unit.

(Storage Unit)

The storage unit 27 corresponds to an example of the first storage unit, and stores information under the control of the control unit 29. In the case of the present embodiment, the storage unit 27 stores weighting factors $w_{\alpha 1}$, $w_{\alpha 2}$, $w_{\alpha 3}$, and $w_{\alpha 4}$ (hereinafter may be simply referred to as a "weighting factor $w_{\alpha}$") of the feedforward control unit **42*b*** to be described below.

The storage unit 27 may sequentially store the weighting factor $w_{\alpha}$ every time the weighting factor $w_{\alpha}$ is adjusted in the feedforward control unit **42*b***.

(Communication Unit)

The communication unit 28 is provided, for example, in an operator cab. The communication unit is communicatively connected to a communication unit 71 of the characteristic change determination device 7 to be described below via a network such as the Internet or a local network. The communication unit 28 establishes communication with the communication unit 71 of the characteristic change determination device 7 under the control of the control unit 29 to send or receive information. The communication unit 28 sends the information acquired from the communication unit 71 of the characteristic change determination device 7 to the control unit 29 under the control of the control unit 29.

(Control Unit)

The control unit 29 controls the actuator of the crane device 2, which is an object to be controlled. The control unit 29 is provided in the cabin 216.

Substantially, the control unit 29 may have a configuration in which a CPU, ROM, RAM, an HDD, and the like are connected by a bus, or a configuration including a one-chip LSI or the like. The control unit 29 stores various programs and data for controlling operations of objects to be controlled such as the actuators, the changeover valves, and the sensors.

The control unit 29 is connected to the slewing base camera 202, the boom camera 206, the slewing operation tool 230, the derricking operation tool 231, the telescoping operation tool 232, the main drum operation tool 233, and the sub-drum operation tool 234.

The control unit 29 acquires image information from the slewing base camera 202 and the boom camera 206. Further, the control unit 29 acquires the operation amount of each of the slewing operation tool 230, the derricking operation tool 231, the telescoping operation tool 232, the main drum operation tool 233, and the sub-drum operation tool 234.

The control unit 29 is connected to a terminal-side control unit 38 of the operation terminal 3. The control unit 29 acquires a control signal from the operation terminal 3.

The control unit 29 is connected to the slewing valve 250, the telescoping valve 251, the derricking valve 252, the main drum valve 253, and the sub-drum valve 254. The control unit 29 sends an actuation signal Md to the slewing valve 250, the telescoping valve 251, the derricking valve 252, the main drum valve 253, and the sub-drum valve 254.

The control unit 29 is connected to the slewing sensor 260, the telescoping sensor 261, the orientation sensor 262, the derricking sensor 263, and the winding sensor 43. The control unit 29 acquires the slewing angle θz of the slewing base 201 from the slewing sensor 260.

The control unit 29 acquires a length Lb of the boom 204 from telescoping sensor 261. The control unit 29 acquires the derricking angle θx from the derricking sensor 263. The control unit 29 acquires an unwinding amount l(n) and an orientation of the main wire rope 213 and/or the sub-wire rope 215 (hereinafter may be simply referred to as the "wire rope") from the winding sensor 43. Note that the information acquired by the control unit 29 from each sensor corresponds to an example of information regarding the pose of the crane.

The control unit 29 generates the actuation signal Md for actuating the actuator corresponding to each operation tool on the basis of the operation amount of the slewing operation tool 230, the derricking operation tool 231, the telescoping operation tool 232, the main drum operation tool 233, and the sub-drum operation tool 234.

The control unit 29 controls the operation of the storage unit 27. The control unit 29 controls the operation of the storage unit 27 so as to store the weighting factor $w_\alpha$ of the feedforward control unit 42*b* to be described below. For example, the control unit 29 controls the operation of the storage unit 27 so as to store the weighting factor $w_\alpha$ every time the weighting factor $w_\alpha$ is adjusted in the feedforward control unit 42*b*.

The control unit 29 controls the operation of the communication unit 28. Thus, some functions of the control unit 29 correspond to an example of a communication control unit. The control unit 29 controls the operation of the communication unit 28 so as to transmit the weighting factor $w_\alpha$ in the feedforward control unit 42*b* to the communication unit 71 of the characteristic change determination device 7 at a predetermined timing.

For example, when the adjustment of the weighting factor $w_\alpha$ in the feedforward control unit 42*b* is completed (that is, in a case where learning is completed), the control unit 29 controls the operation of the communication unit 28 so as to transmit the weighting factor $w_\alpha$ in the feedforward control unit 42*b* to the communication unit 71 of the characteristic change determination device 7 at a predetermined timing.

Alternatively, the control unit 29 controls the operation of the communication unit 28 so as to transmit the weighting factor $w_\alpha$ in the feedforward control unit 42*b* to the communication unit 71 of the characteristic change determination device 7 every time the weighting factor $w_\alpha$ is adjusted in the feedforward control unit 42*b* (that is, every learning).

The crane C having the above configuration can move to an arbitrary position by causing the vehicle 1 to travel. Further, the crane C can change the derricking angle θx of the boom 204 according to the operation of the derricking operation tool 231. Further, the crane C can change the length of the boom 204 according to the operation of the telescoping operation tool 232.

The crane C can increase or decrease the lifting height and working radius of the crane device 2 by changing the derricking angle θx of the boom 204 and/or the length of the boom 204.

Further, the crane C can change the height of the main hook 208 or the sub-hook 210 according to the operation of the main drum operation tool 233 or the sub-drum operation tool 234. Further, the crane C can slew the slewing base 201 according to the operation of the slewing operation tool 230.

(Operation Terminal)

Figure 4:
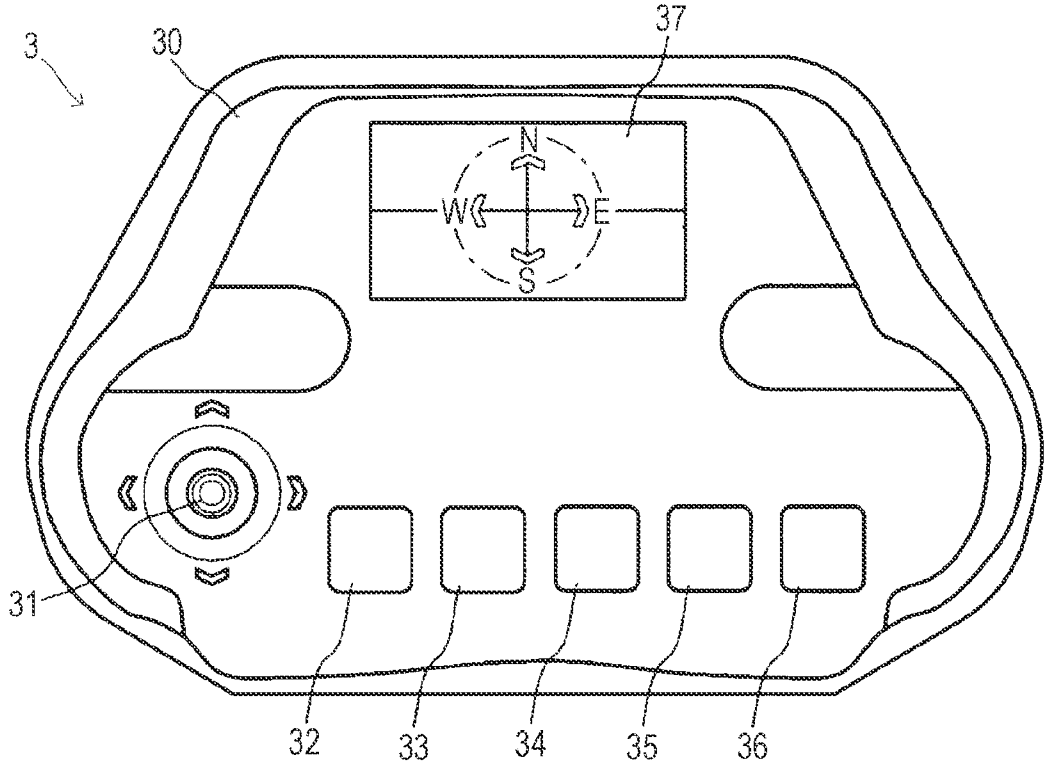
FIG. 4 is a plan diagram of an operation terminal.
Figure 5:
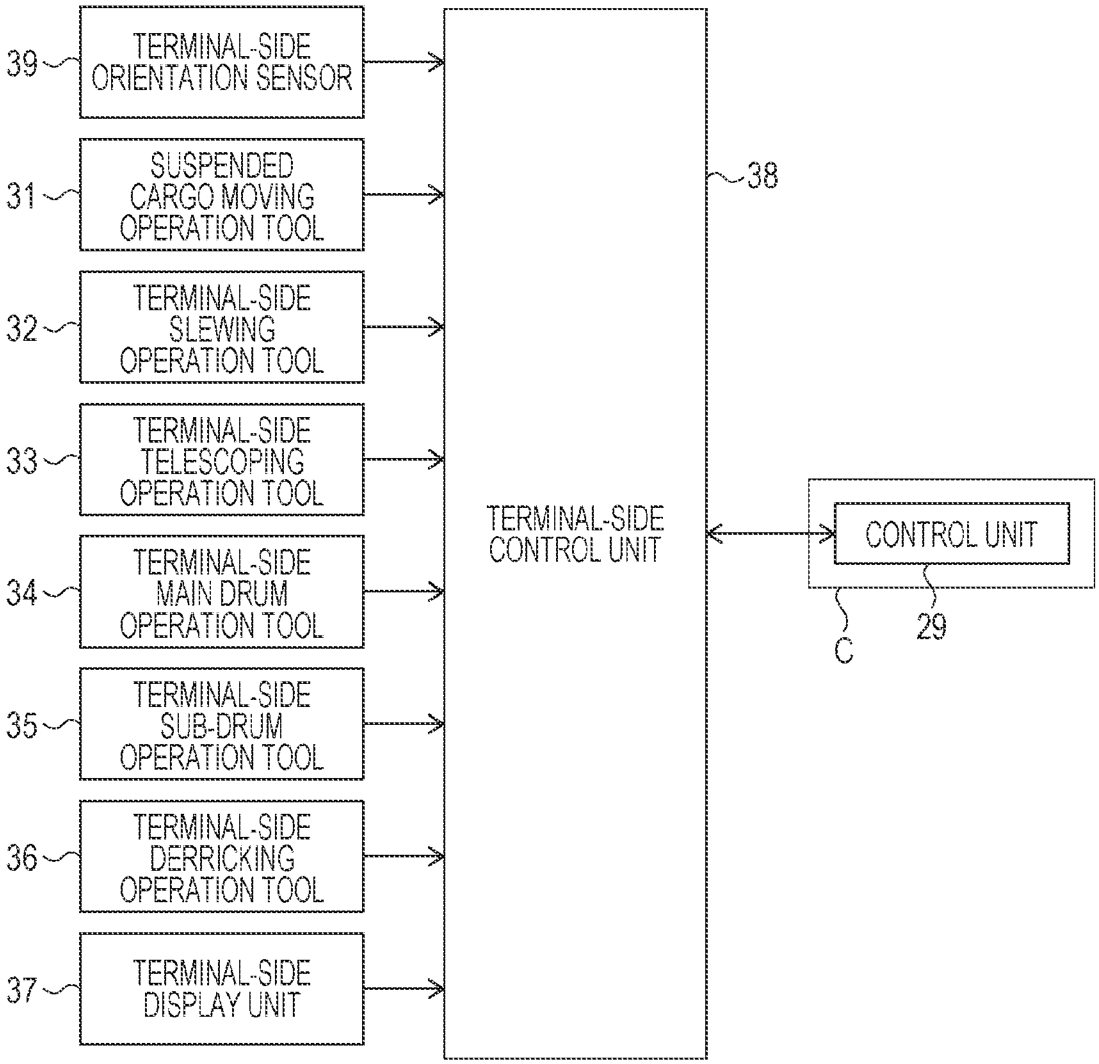
FIG. 5 is a block diagram for describing a configuration of the operation terminal.

The operation terminal 3 corresponds to an example of the operation input unit, and is a device for the operator to input support regarding the moving direction and/or the moving velocity of the cargo W as illustrated in FIGS. 4 and 5.

The operation terminal 3 includes a housing 30 and operation tools such as a suspended cargo moving operation tool 31, a terminal-side slewing operation tool 32, a terminal-side telescoping operation tool 33, a terminal-side main drum operation tool 34, a terminal-side sub-drum operation tool 35, and a terminal-side derricking operation tool 36.

Further, the operation terminal 3 includes a terminal-side display unit 37 and a terminal-side control unit 38. The operation terminal 3 generates the target velocity signal Vd of the cargo W on the basis of the operation (operation signal) of the suspended cargo moving operation tool 31 or each operation tool, and transmits the generated target velocity signal Vd to the control unit 29 of the crane C (crane device 2). Note that when the cargo W is moved by the operation of one operation tool (for example, the terminal-side slewing operation tool 32) (that is, in the case of slewing movement), an operation signal corresponding to the tilt direction and/or the tilt amount of the one operation tool (for example, the terminal-side slewing operation tool 32) is generated. On the other hand, when the cargo W is moved by the operation of the plurality of operation tools (for example, the terminal-side slewing operation tool 32, the terminal-side derricking operation tool 36, and the terminal-side main drum operation tool 34) (for example, in the case of linear movement), an operation signal corresponding to the tilt direction and/or the tilt amount of each of the plurality of operation tools is generated. As described above, the operation signal can include an operation signal related to one or a plurality of operation tools.

The suspended cargo moving operation tool 31 is an operation tool that is operated when the operator instructs the moving direction and/or speed of the cargo W on a horizontal plane. The suspended cargo moving operation tool 31 includes an operation stick erecting substantially perpendicularly from the operation surface of the housing 30, and a sensor (not illustrated) that detects a tilt direction and a tilt amount of the operation stick.

With a first direction (upward direction in FIG. 4) is set as an extension direction of the boom 204, the suspended cargo moving operation tool 31 delivers an operation signal corresponding to the tilt direction and the tilt amount of the operation stick detected by the sensor to the terminal-side control unit 38. The first direction is, for example, a direction along the operation surface of the operation terminal 3 and a direction toward the front of the operator in a use state in which the operator holds the operation terminal 3 with both hands.

The terminal-side slewing operation tool 32 is an operation tool for the operator to instruct a direction and/or speed related to slewing of the crane device 2.

The terminal-side telescoping operation tool 33 is an operation tool for the operator to instruct a direction and/or speed related to telescoping of the boom 204.

The terminal-side main drum operation tool 34 is an operation tool for the operator to instruct a direction and/or speed (that is, moving direction and/or speed of the main hook 208) related to the rotation of the main winch 212.

The terminal-side sub-drum operation tool 35 is an operation tool for the operator to instruct a direction and/or speed (that is, moving direction and/or speed of the sub-hook 210) related to the rotation of the sub-winch 214.

The terminal-side derricking operation tool 36 is an operation tool for the operator to instruct a direction and/or speed related to derricking of the boom 204.

Each operation tool described above includes an operation stick erecting substantially perpendicularly from the operation surface of the housing 30, and a sensor (not illustrated) that detects a tilt direction and/or a tilt amount of the operation stick.

The terminal-side display unit 37 displays various information such as pose information of the crane C and/or information of the cargo W. The terminal-side display unit 37 is provided on the operation surface of the housing 30. The terminal-side display unit 37 displays the orientation while setting the extension direction of the boom 204 to upward with respect to the terminal-side display unit 37.

The terminal-side control unit 38 controls the operation terminal 3 as illustrated in FIG. 5. The terminal-side control unit 38 is provided in the housing 30. The terminal-side control unit 38 may have a configuration in which a CPU, ROM, RAM, an HDD, and the like are connected by a bus, or a configuration including a one-chip LSI or the like.

The terminal-side control unit 38 stores various programs and data for controlling the operation of the suspended cargo moving operation tool 31, the terminal-side slewing operation tool 32, the terminal-side telescoping operation tool 33, the terminal-side main drum operation tool 34, the terminal-side sub-drum operation tool 35, the terminal-side derricking operation tool 36, the terminal-side display unit 37, and the like.

The terminal-side control unit 38 is connected to the suspended cargo moving operation tool 31, the terminal-side slewing operation tool 32, the terminal-side telescoping operation tool 33, the terminal-side main drum operation tool 34, the terminal-side sub-drum operation tool 35, and the terminal-side derricking operation tool 36, and acquires an operation signal corresponding to the tilt direction and/or the tilt amount of each operation tool.

The terminal-side control unit 38 generates the target velocity signal Vd of the cargo W from the acquired operation signal. Further, the terminal-side control unit 38 is connected to the control unit 29 of the crane device 2 by wire or wirelessly, and transmits the generated target velocity signal Vd of the cargo W to the control unit 29 of the crane device 2.

(Operation Example of Operation Terminal and Crane)

Next, an operation example of the operation terminal 3 will be described with reference to FIG. 6.

Figure 6:
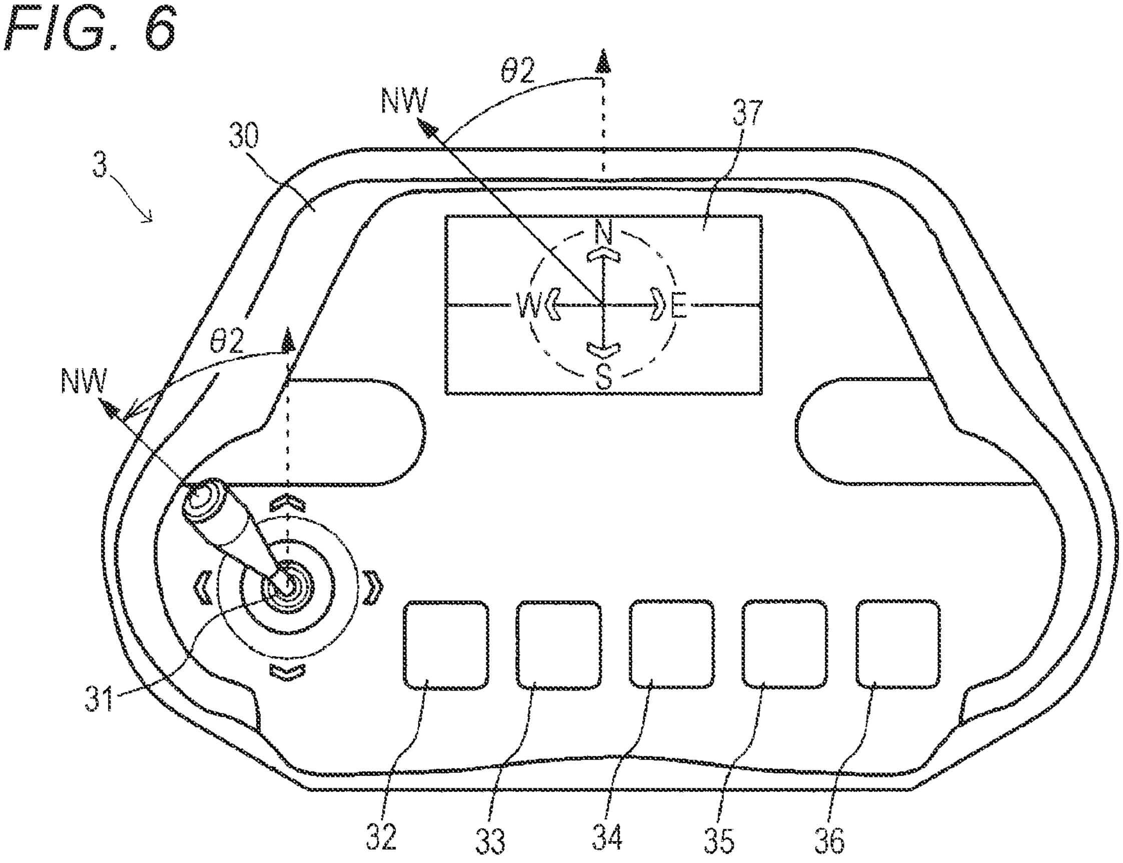
FIG. 6 is a plan diagram of the operation terminal for describing a transport direction (orientation) of cargo when a suspended cargo moving operation tool is operated.

First, it is assumed that the distal end of the boom 204 faces north as illustrated in FIG. 6. In this state, the operator performs operation to tilt the suspended cargo moving operation tool 31 leftward relative to the upward direction by an arbitrary tilt amount in the direction of a tilt angle $\theta 2=45°$.

Then, the terminal-side control unit 38 acquires an operation signal corresponding to the tilt direction and the tilt amount of the suspended cargo moving operation tool 31 from a sensor (not illustrated) provided in the suspended cargo moving operation tool 31.

Furthermore, the terminal-side control unit 38 calculates the target velocity signal Vd for moving the cargo W at a speed corresponding to the tilt amount of the suspended cargo moving operation tool 31 every unit time t on the basis of the acquired operation signal. Then, the operation terminal 3 transmits the calculated target velocity signal Vd to the control unit 29 of the crane device 2 every unit time t.

When receiving the target velocity signal Vd from the operation terminal 3 every unit time t, the control unit 29 of the crane device 2 calculates a target trajectory signal Pd of the cargo W on the basis of the orientation of the distal end of the boom 204 acquired by the orientation sensor 262.

Furthermore, the control unit 29 of the crane device 2 calculates target position coordinates p(n+1) of the cargo W, which are a target position of the cargo W, on the basis of the calculated target trajectory signal Pd.

Then, the control unit 29 generates an actuation signal Md related to a valve that needs to be operated to move the cargo W to the target position coordinates p(n+1) among the slewing valve 250, the telescoping valve 251, the derricking valve 252, the main drum valve 253, and the sub-drum valve 254.

On the basis of the actuation signal Md, the crane C transports the cargo W at a speed corresponding to the tilt amount of the suspended cargo moving operation tool 31 toward the tilt direction of the suspended cargo moving operation tool 31. At this time, the crane C controls the actuator (for example, the slewing hydraulic motor 203, the telescoping hydraulic cylinder 218, the derricking hydraulic cylinder 211, and the like) that needs to be operated to transport the cargo W according to the actuation signal Md.

Note that, in the present embodiment, the operation terminal 3 is provided in the cabin 216. However, the operation terminal may be a remote operation terminal wirelessly connected to the crane C.

(Regarding Control Example of Crane)

Figure 7:
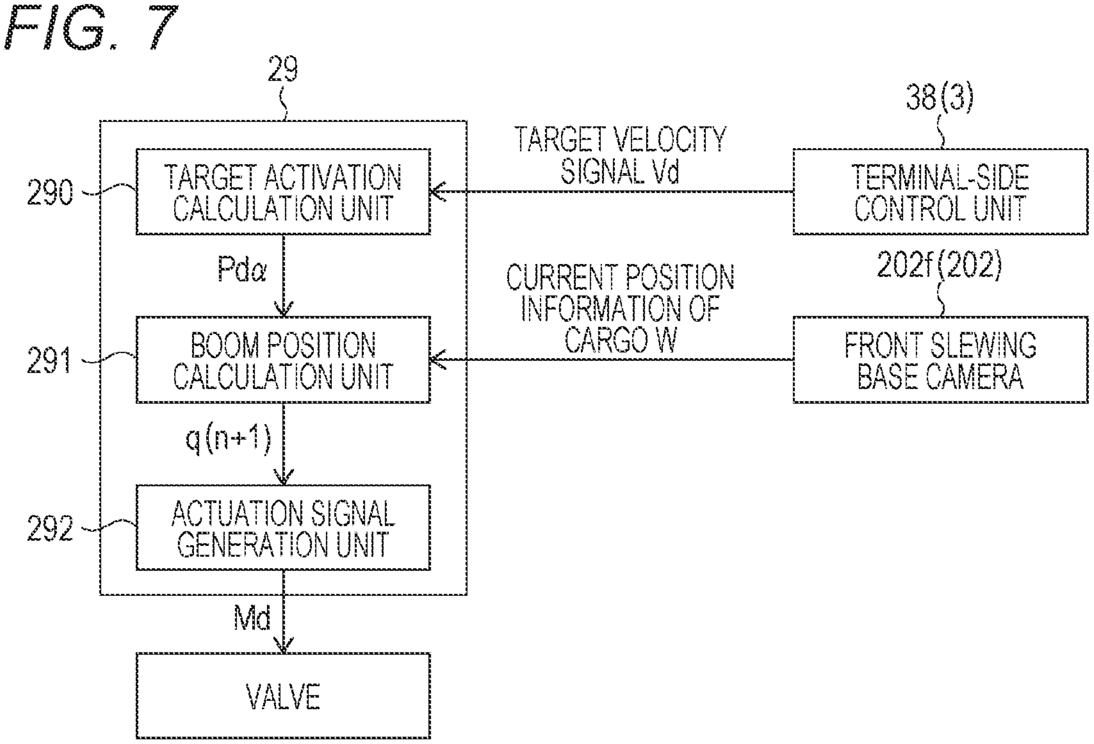
FIG. 7 is a block diagram for describing a function of a control unit of a crane.

Next, a process of calculating the target trajectory signal Pd of the cargo W and target position coordinates q(n+1) of the distal end of the boom 204 with the control unit 29 of the crane device 2 will be described with reference to FIGS. 7 to 13. Note that FIG. 7 illustrates a configuration in which the operation signal and the target velocity signal Vd of the cargo W are generated in the operation terminal 3 (operation input unit). However, as a modification, the operation signal may be generated in the operation unit 217. In such a modification, the target velocity signal Vd may be generated by the operation unit 217 or the control unit 29 of the crane C (crane device 2) on the basis of the operation signal. A functional unit that generates the target velocity signal Vd in the crane C is referred to as the target velocity signal generation unit (not illustrated). For the modification, it is sufficient if the description described below is appropriately replaced.

The control unit 29 includes a target trajectory calculation unit 290, a boom position calculation unit 291, and an actuation signal generation unit 292 in addition to the elements described above. Further, the control unit 29 acquires current position information of the cargo W from the pair of front slewing base cameras **202*f***, which is the cargo position detection means.

As illustrated in FIG. 7, the target trajectory calculation unit 290 acquires the target velocity signal Vd of the cargo W corresponding to the moving direction and/or speed of the cargo W from the operation terminal 3 every unit time t. Then, the target trajectory calculation unit 290 calculates a target trajectory signal Pd, of the cargo W on the basis of the acquired target velocity signal Vd of the cargo W. Note that, in the case of the modification described above, the target trajectory calculation unit 290 acquires the target velocity signal Vd of the cargo W corresponding to the moving direction and/or speed of the cargo W from the target velocity signal generation unit (not illustrated) of the crane C every unit time t.

Specifically, the target trajectory calculation unit 290 integrates the acquired target velocity signal Vd to calculate the target trajectory signal $Pd_\alpha$ for each of the x-axis direction, the y-axis direction, and the z-axis direction of the cargo W every unit time t. Here, the subscript α represents any of the x-axis direction, the y-axis direction, and the z-axis direction.

The boom position calculation unit 291 acquires the target trajectory signal $Pd_{\alpha}$ from the target trajectory calculation unit 290. The boom position calculation unit 291 acquires a slewing angle θz(n) of the slewing base 201 from the slewing sensor 260.

Further, the boom position calculation unit 291 acquires a telescoping length lb(n) from the telescoping sensor 261. Further, the boom position calculation unit 291 acquires a derricking angle θx(n) from the derricking sensor 263.

The boom position calculation unit 291 acquires the unwinding amount l(n) of the wire rope (the main wire rope 213 or the sub-wire rope 215) being used from the winding sensor 43.

The boom position calculation unit 291 acquires the current position information of the cargo W. The boom position calculation unit 291 may acquire the current position information of the cargo W from the pair of front slewing base cameras 202*f*. Alternatively, the boom position calculation unit 291 may acquire the current position information of the cargo W on the basis of the image information of the cargo W acquired from the pair of front slewing base cameras 202*f*.

The slewing angle θz(n), the telescoping length lb(n), and the derricking angle θx(n) acquired by the boom position calculation unit 291 each correspond to an example of the pose information of the boom 204.

The boom position calculation unit 291 acquires current position coordinates q(n) of the distal end of the boom 204 on the basis of the acquired pose information of the boom 204.

The boom position calculation unit 291 calculates the current position coordinates p(n) of the cargo W on the basis of the acquired current position information of the cargo W. Further, the boom position calculation unit 291 calculates the unwinding amount l(n) of the wire rope on the basis of the current position coordinates p(n) of the cargo W and the current position coordinates q(n) of the boom 204.

Further, the boom position calculation unit 291 calculates the target position coordinates p(n+1) of the cargo W, which are the position of the cargo W after a lapse of the unit time t, from the target trajectory signal $Pd_{\alpha}$. Furthermore, the boom position calculation unit 291 calculates a direction vector e(n+1) of the wire rope (the main wire rope 213/or the sub-wire rope 215) suspending the cargo W on the basis of the current position coordinates p(n) of the cargo W and the target position coordinates p(n+1) of the cargo W.

The boom position calculation unit 291 calculates the target position coordinates q(n+1) of the boom 204, which are the position of the distal end of the boom 204 after a lapse of the unit time t, on the basis of the target position coordinates p(n+1) of the cargo W and the direction vector e(n+1) of the wire rope by inverse dynamics. Then, the boom position calculation unit 291 sends the calculated target position coordinates q(n+1) of the boom 204 to the actuation signal generation unit 292.

The actuation signal generation unit 292 acquires the target position coordinates q(n+1) of the boom 204 from the boom position calculation unit 291. Then, the actuation signal generation unit 292 generates the actuation signal Md of each actuator on the basis of the acquired target position coordinates q(n+1) of the boom 204.

The actuation signal generation unit 292 generates the actuation signal Md of at least one valve of the slewing valve 250, the telescoping valve 251, the derricking valve 252, the main drum valve 253, and the sub-drum valve 254.

Figure 8:
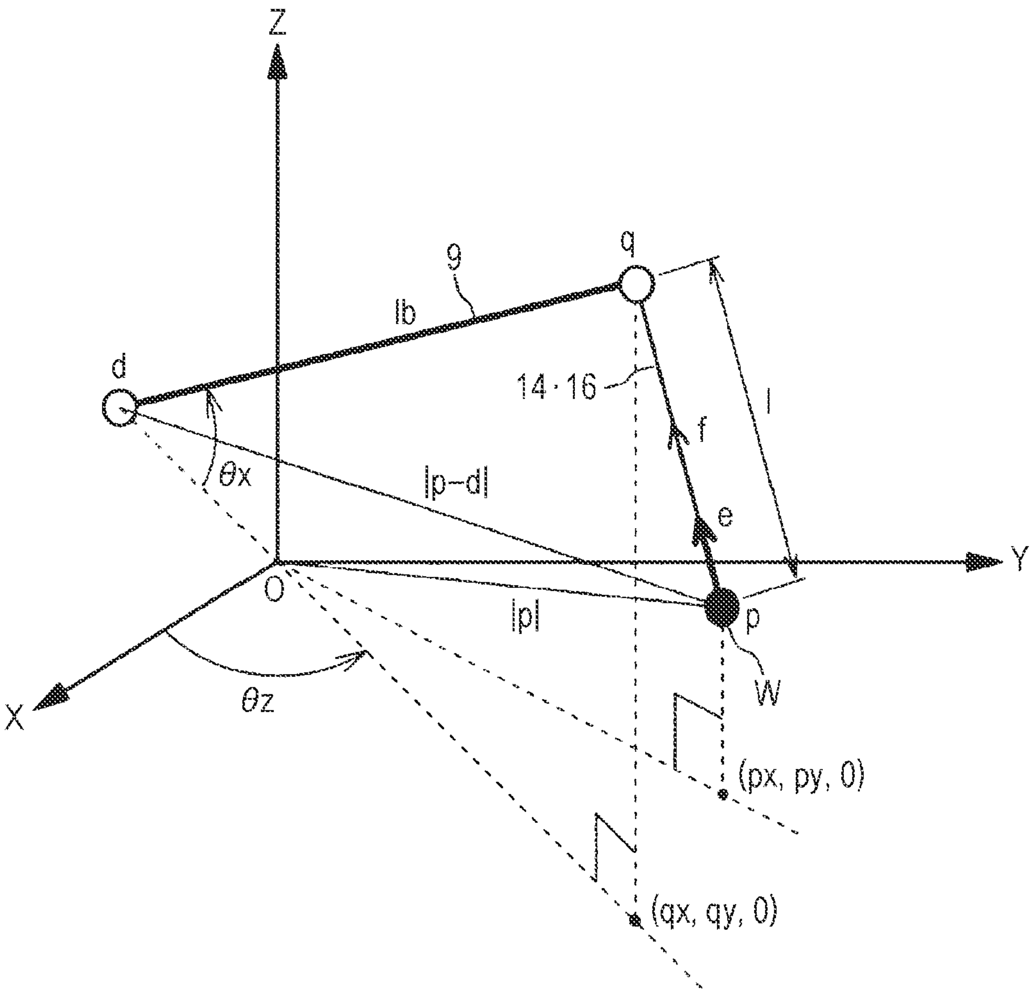
FIG. 8 is a diagram for describing an inverse dynamics model of a crane.

Here, a method in which the boom position calculation unit 291 calculates the target position coordinates q(n+1) of the distal end of the boom 204 will be described with reference to FIG. 8. First, the control unit 29 (specifically, the boom position calculation unit 291) determines an inverse dynamics model of the crane C. The inverse dynamics model is defined in an XYZ coordinate system, and an origin O is the slewing center of the crane C.

Further, the control unit 29 defines each of q, p, lb, θx, θz, l, f, and e in the inverse dynamics model. For example, q represents the current position coordinates q(n) of the distal end of the boom 204. For example, p represents the current position coordinates p(n) of the cargo W.

For example, lb represents the telescoping length lb(n) of the boom 204. For example, θx represents the derricking angle θx(n). For example, θz represents the slewing angle θz(n). For example, l represents the unwinding amount l(n) of the wire rope. f represents a tension f of the wire rope. For example, e represents a direction vector e(n) of the wire rope.

In the inverse dynamics model determined in this manner, the relationship between a target position q of the distal end of the boom 204 and a target position p of the cargo W is expressed by Formula (1) on the basis of the target position p of the cargo W, mass m of the cargo W, and a spring constant kf of the wire rope. Then, the target position q of the distal end of the boom 204 is calculated by Formula (2), which is a function of the time of the cargo W.

[Math. 1]

$$m\ddot{p}=mg+f=mg+k_f(q-p) \tag{1}$$

[Math. 2]

$$q(t)=p(t)+l(t,\alpha)e(t)=q(p(t),\ddot{p}(t),\alpha) \tag{2}$$

f: Tension of wire rope
kf: Spring constant
m: Mass of cargo W
q: Current position or target position of distal end of boom 204
p: Current position or target position of cargo W
l: Unwinding amount of wire rope
e: Direction vector
g: Gravitational acceleration Further, the unwinding amount l(n) of the wire rope is calculated from Formula (3) described below. The unwinding amount l(n) of the wire rope is defined by a distance between the current position coordinates q(n) of the boom 204, which are the distal end position of the boom 204, and the current position coordinates p(n) of the cargo W, which are the position of the cargo W.

[Math. 3]

$$l(n)^2=|q(n)-p(n)|^2 \tag{3}$$

Further, the direction vector e(n) of the wire rope is calculated from Formula (4) described below. The direction vector e(n) of the wire rope is a vector having a unit length of the tension f of the wire rope. The tension f of the wire rope is calculated by subtracting the gravitational acceleration from the acceleration of the cargo W calculated on the basis of the current position coordinates p(n) of the cargo W and the target position coordinates p(n+1) of the cargo W after a lapse of the unit time t.

[Math. 4]

$$e(n)=\frac{f}{|f|}-\frac{\ddot{p}(n)-g}{|\ddot{p}(n)-g|} \quad (4)$$

Then, the target position coordinates q(n+1) of the boom 204, which are the target position of the distal end of the boom 204 after a lapse of the unit time t, are calculated from Formula (5) that expresses Formula (2) described above by the function n. Here, α represents the slewing angle θz(n) of the boom 204. In this manner, the target position coordinates q(n+1) of the boom 204 are calculated by inverse dynamics on the basis of the unwinding amount l(n) of the wire rope, the target position coordinates p(n+1) of the cargo W, and the direction vector e(n+1).

[Math. 5]

$$q(n+1)=p(n+1)+l(n,\alpha)e(t+1)=q(p(n+1),\ddot{p}(n+1),\alpha) \quad (5)$$

(Control System)

Next, the control system 42 of the crane C will be described. Note that the control system 42 may be regarded as a system including elements constituting the control unit 29 in the crane C. Thus, the constituent elements of the control system 42 are also constituent elements of the control unit 29.

The control system 42 includes the feedback control unit 42*a* and the feedforward control unit 42*b*.

(Feedback Control Unit)

The feedback control unit 42*a* includes the target trajectory calculation unit 290, the boom position calculation unit 291, the actuation signal generation unit 292, and the front slewing base cameras 202*f*, which are the cargo position detection means. Such a feedback control unit 42*a* performs feedback control of the crane C or an object to be controlled, which is a component (specifically, the actuator) of the crane C. The object to be controlled is as described above.

Specifically, when the feedback control unit 42*a* acquires the target velocity signal Vd of the cargo W, the target trajectory calculation unit 290 calculates the target trajectory signal Pd, in the x-axis direction, the y-axis direction, and the z-axis direction of the cargo W.

Next, the feedback control unit 42*a* calculates the current position coordinates p(n) of the cargo W on the basis of the current position information of the cargo W acquired from the cargo position detection means (in the case of the present embodiment, the front slewing base cameras 202*f*).

Then, the feedback control unit 42*a* feeds back (negatively feeds back) the current position coordinates p(n) of the cargo W to the target trajectory signal $Pd_{\alpha}$.

The feedback control unit 42*a* generates a target trajectory signal $Pd\mathbf{1}_{\alpha}$ by correcting the target trajectory signal $Pd_{\alpha}$ according to the current position coordinates p(n) of the cargo W (in the case of the present embodiment, by obtaining a difference between the current position coordinates p(n) and the target trajectory signal $Pd_{\alpha}$). The target trajectory signal $Pd\mathbf{1}_{\alpha}$ corresponds to an example of the first signal. This target trajectory signal $Pd\mathbf{1}_{\alpha}$ is a teacher signal for learning performed by the feedforward control unit 42*b* described below.

Next, the feedback control unit 42*a* calculates the target position coordinates q(n+1) of the boom 204 after a lapse of the unit time t on the basis of a target trajectory signal $Pd\mathbf{2}_{\alpha}$, the pose information (slewing angle θz(n), telescoping length lb(n), derricking angle θx(n), and unwinding amount l(n)) of the crane C acquired from each sensor, and the current position information of the cargo W acquired from the slewing base camera 202 in the boom position calculation unit 291. Note that the target trajectory signal $Pd\mathbf{2}_{\alpha}$ is a signal obtained by correcting the target trajectory signal $Pd\mathbf{1}_{\alpha}$ by the output of the feedforward control unit 42*b* described below.

Next, the feedback control unit 42*a* generates the actuation signal Md of the object to be controlled (each actuator) on the basis of the target position coordinates q(n+1) in the actuation signal generation unit 292. The feedback control unit 42*a* actuates the object to be controlled (each actuator) of the crane C according to the actuation signal Md and transports the cargo W.

(Feedforward Control Unit)

The feedforward control unit 42*b* includes a mathematical model having the weighting factor $w_{\alpha}$ (specifically, $w_{\alpha1}$, $w_{\alpha2}$, $w_{\alpha3}$, and $w_{\alpha4}$).

Such a feedforward control unit 42*b* has a function of learning the characteristics of the object to be controlled in real time by adjusting the weighting factor $w_{\alpha}$ on the basis of a teacher signal including a first signal (specifically, the target trajectory signal $Pd\mathbf{1}_{\alpha}$) generated in the feedback control unit 42*a*. The feedforward control unit 42*b* corresponds to an example of the learning model.

In the case of the present embodiment, the feedforward control unit 42*b* achieves a so-called inverse model of the object to be controlled by learning the characteristics of the object to be controlled in real time.

The initial value of the weighting factor $w_{\alpha}$ of the feedforward control unit 42*b* is set for each operation of the crane C.

The initial value of the weighting factor $w_{\alpha}$ of the feedforward control unit 42*b* may be any preset value. Further, the initial value of the weighting factor $w_{\alpha}$ may be the weighting factor $w_{\alpha}$ stored in advance in the storage unit 27. Further, the initial value of the weighting factor $w_{\alpha}$ is preferably the weighting factor $w_{\alpha}$ corresponding to the object to be controlled in the initial state (in other words, in an unused state or in a normal state) of the crane C.

The initial value of the weighting factor $w_{\alpha}$ may be a weighting factor $w_{\alpha s}$ of a reference model stored in a storage unit 73 of the characteristic change determination device 7 described below. In this case, the control system 42 (specifically, the feedforward control unit 42*b*) acquires the weighting factor $w_{\alpha s}$ of the reference model from the characteristic change determination device 7, and sets the acquired weighting factor $w_{\alpha s}$ as the weighting factor of the feedforward control unit 42*b*.

Further, the feedforward control unit 42*b* has a function of performing feedforward control of the object to be controlled in cooperation with the feedback control unit 42*a*.

The feedforward control unit 42*b* can be regarded as a low-pass filter Lp expressed by a transfer function G(s) as expressed in Formula (6) described below. The low-pass filter Lp attenuates frequencies equal to or higher than a predetermined frequency.

The transfer function G(s) of the feedforward control unit 42*b* is expressed in a form obtained by performing partial fraction decomposition by using A, B, and C as factors, $w_{\alpha1}$, $w_{\alpha2}$, $w_{\alpha3}$, and $w_{\alpha4}$ as weighting factors, and s as a differential element. Here, the subscript α is a sign representing any of the x axis, the y axis, and the z axis.

That is, the transfer function G(s) expressed by Formula (6) is set for each of the x axis, the y axis, and the z axis. In other words, the mathematical model having the transfer function G(s) is set for each of the x axis, the y axis, and the z axis. As described above, the transfer function G(s) is expressed as a superposition of first-order lag transfer functions.

[Math. 6]

$$G(s) - \frac{w_{\alpha 1}}{s} + \frac{w_{\alpha 2}}{(As+1)} + \frac{w_{\alpha 3}}{(Bs+1)} + \frac{w_{\alpha 4}}{(Cs+1)}. \quad (6)$$

Figure 9:
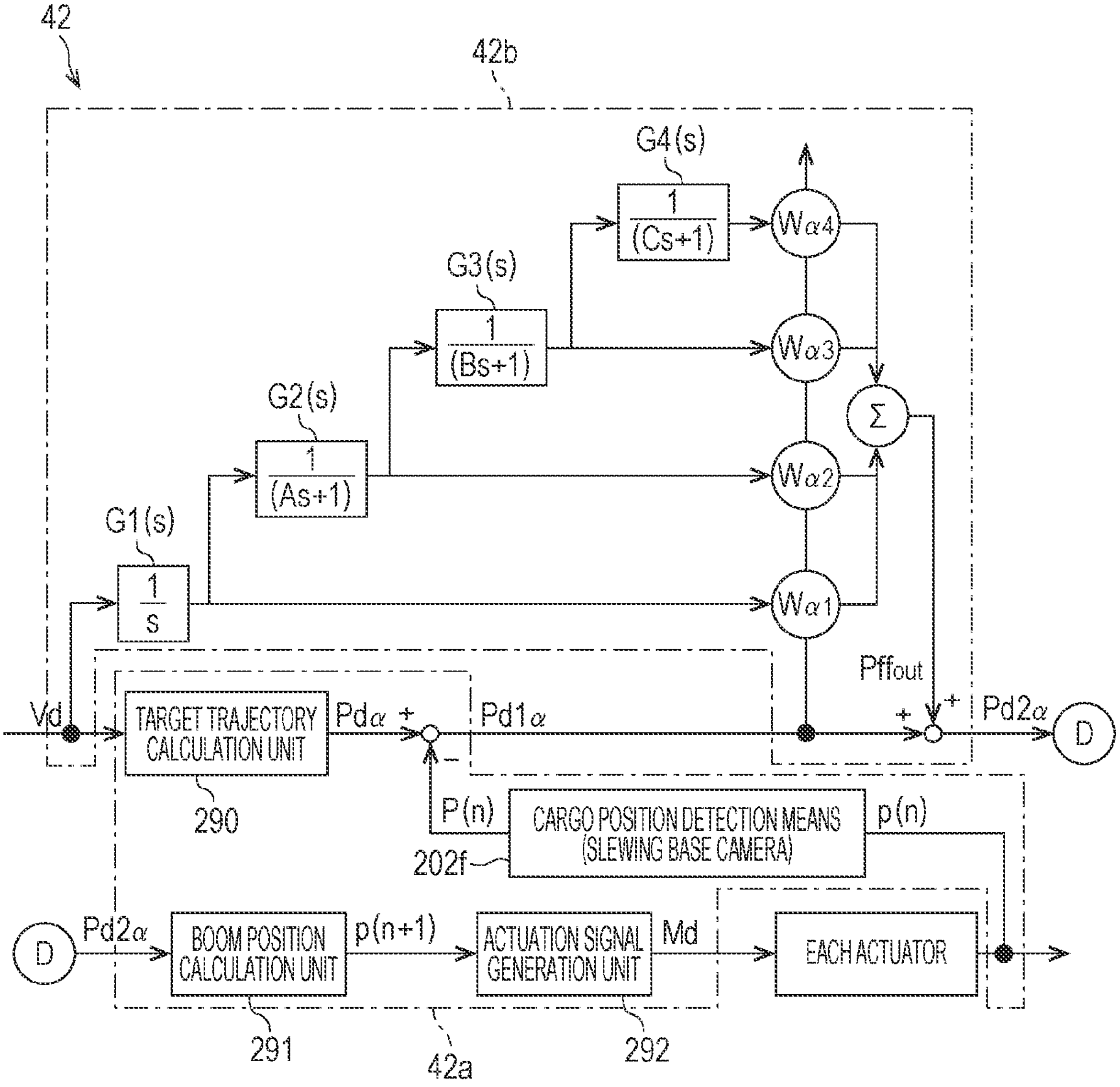
FIG. 9 is a block diagram illustrating a configuration of a control unit of a crane.

As illustrated in FIG. 9 and expressed in Formula (6) described above, the feedforward control unit 42*b* superimposes a first model G1(*s*), a second model G2(*s*), a third model G3(*s*), and a fourth model G4(*s*), which are first-order lag transfer functions obtained by partial fraction decomposition of a quartic transfer function G(s).

Further, the feedforward control unit 42*b* uses the gain of the transfer function G(s) as a weighting factor, and assigns the weighting factor $w_{\alpha 1}$ to the first model G1(*s*), the weighting factor $w_{\alpha 2}$ to the second model G2(*s*), the weighting factor $w_{\alpha 3}$ to the third model G3(*s*), and the weighting factor $w_{\alpha 4}$ to the fourth model G4(*s*).

As described above, the feedforward control unit 42*b* learns the characteristics of the object to be controlled by adjusting the weighting factors $w_{\alpha 1}$, $w_{\alpha 2}$, $w_{\alpha 3}$, and $w_{\alpha 4}$ of each model in real time on the basis of the target trajectory signal $Pd\mathbf{1}_{\alpha}$ of the cargo W corrected by the feedback control unit 42*a*.

When the target velocity signal Vd of the cargo W is input to the feedforward control unit 42*b*, the feedforward control unit 42*b* outputs a correction signal $Pff_{out}$.

In the case of the present embodiment, the target trajectory signal $Pd\mathbf{1}_{\alpha}$ generated by the feedback control unit 42*a* is corrected by the correction signal $Pff_{out}$ to become the target trajectory signal $Pd\mathbf{2}_{\alpha}$. Since the flow of the signal in the feedforward control unit 42*b* is as illustrated in FIG. 9, detailed description thereof will be omitted.

Note that the feedforward control unit 42*b* adjusts the weighting factor $w_{\alpha}$ so that the target trajectory signal $Pd\mathbf{1}_{\alpha}$, which is a difference between the target trajectory signal $Pd_{\alpha}$ and the current position coordinates p(n) of the cargo W, becomes small.

Accordingly, the target trajectory signal $Pd\mathbf{1}_{\alpha}$ becomes smaller as the learning of the feedforward control unit 42*b* progresses. In other words, as the learning of the feedforward control unit 42*b* progresses, the proportion of the output (that is, the correction signal $Pff_{out}$) of the feedforward control unit 42*b* included in the target trajectory signal $Pd\mathbf{2}_{\alpha}$ increases.

In a state in which the learning of the feedforward control unit 42*b* is completed, the control system 42 is in a state of controlling the object to be controlled (each actuator) on the basis of the output (that is, the correction signal $Pff_{out}$) of the feedforward control unit 42*b*.

Note that the feedforward control unit 42*b* (that is, the learning model) may be provided in association with each object to be controlled (that is, each actuator). Further, the feedforward control unit 42*b* may not have the function of controlling the object to be controlled as long as it has the function of learning the characteristics of the object to be controlled.

(Regarding Control of Control System)

Next, with reference to FIGS. 10 to 13, a method of calculating the target trajectory signal Pd of the cargo W for generating the actuation signal Md in the control system 42 of the crane C and a method of calculating the target position coordinates q(n+1) of the distal end of the boom 204 will be described in detail. Note that the term "control system 42" in the description described below may be appropriately replaced with the term "control unit 29".

Figure 10:
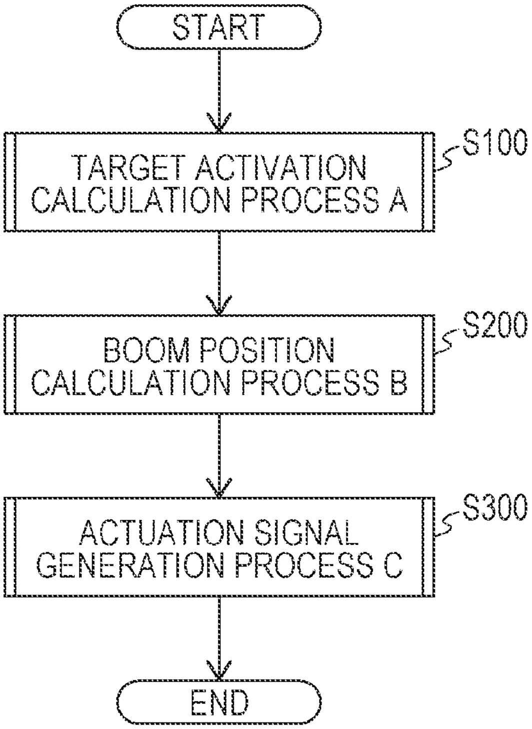
FIG. 10 is a flowchart for describing a crane control process.

In step S100 of FIG. 10, the control system 42 starts a target trajectory calculation process A. When the target trajectory calculation process A ends, the control system 42 starts a boom position calculation process B in step S200. Then, when the boom position calculation process B ends, the control system 42 starts an actuation signal generation process C in step S300. The control system 42 appropriately repeats steps S100 to S300.

Figure 11:
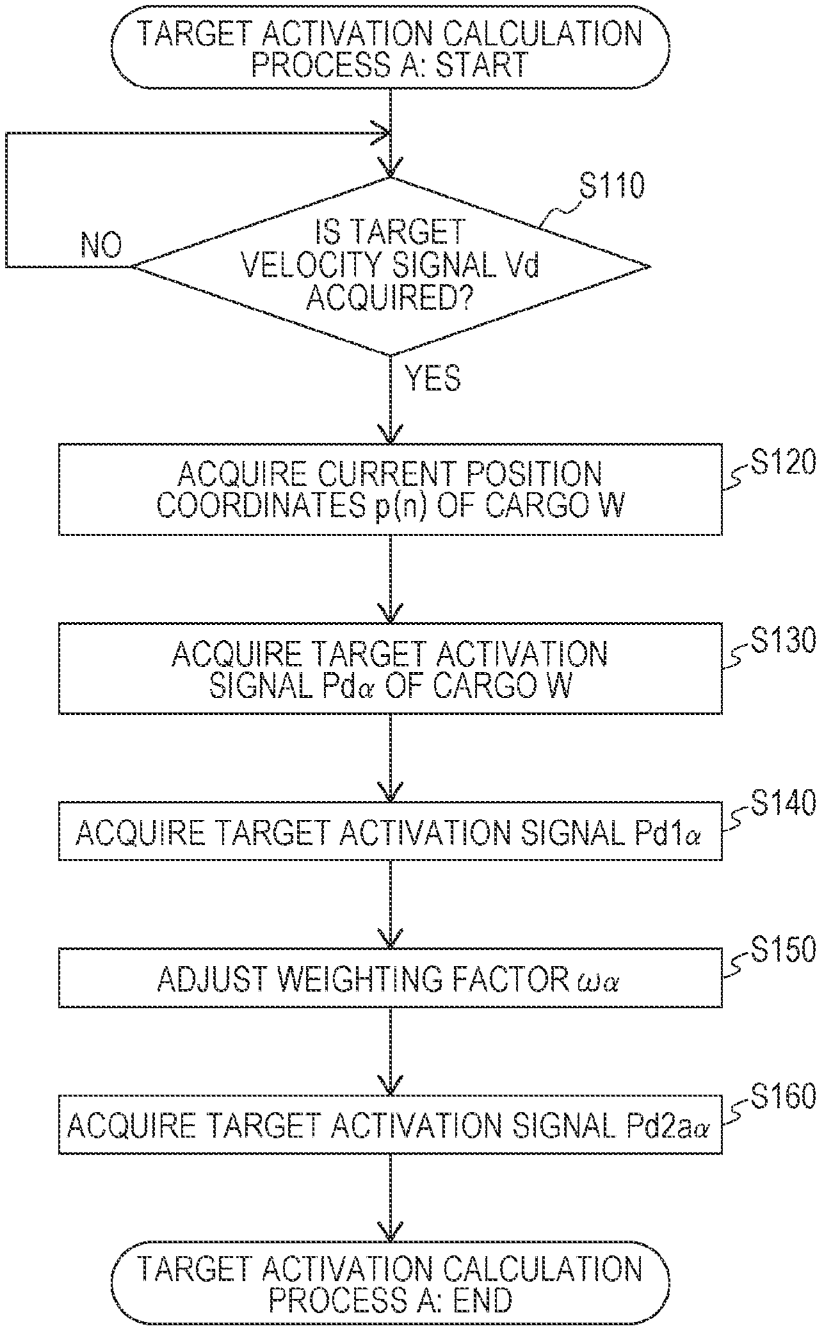
FIG. 11 is a flowchart for describing a crane control process.

In the target trajectory calculation process A, the control system 42 performs control processing illustrated in FIG. 11.

In step S110, the control system 42 determines whether the target trajectory calculation unit 290 of the control unit 29 has acquired the target velocity signal Vd of the cargo W. When the target velocity signal Vd of the cargo W is acquired ("YES" in step S110), the control system 42 shifts the control processing to step 3120.

On the other hand, when the target velocity signal Vd of the cargo W is not acquired ("NO" in step S110), the control system 42 shifts the control processing to step S110.

In step S120, the control system 42 acquires the current position coordinates p(n) of the cargo W. Specifically, the control system 42 captures an image of the cargo W with the pair of front slewing base cameras 202*f*. Then, the control system 42 calculates the current position coordinates p(n) of the cargo W while setting an arbitrarily set reference position O (for example, the slewing center of the boom 204) as an origin on the basis of the imaging information acquired from the pair of front slewing base cameras 202*f*. Note that the current position coordinates p(n) of the cargo W may be calculated by the pair of front slewing base cameras 202*f*.

In step S130, the control system 42 acquires the target trajectory signal $Pd_{\alpha}$ of the cargo W. Specifically, the control system 42 calculates the target trajectory signal $Pd_{\alpha}$ of the cargo W by integrating the acquired target velocity signal Vd of the cargo W acquired by the target trajectory calculation unit 290.

In step S140, the control system 42 acquires the target trajectory signal $Pd\mathbf{1}_{\alpha}$. Specifically, the control system 42 calculates the target trajectory signal $Pd\mathbf{1}_{\alpha}$, which is a difference between the current position coordinates p(n) and the target trajectory signal $Pd_{\alpha}$ of the cargo W by the feedback control unit 42*a*.

In step S150, the control system 42 (specifically, the feedforward control unit 42*b*) adjusts the weighting factor $w_{\alpha}$ (specifically, the weighting factors $w_{\alpha 1}$, $w_{\alpha 2}$, $w_{\alpha 3}$, and $w_{\alpha 4}$) of the feedforward control unit 42*b* using the target trajectory signal $Pd\mathbf{1}_{\alpha}$ as a teacher signal.

In step S160, the control system 42 acquires the target trajectory signal $Pd\mathbf{2}_{\alpha}$. Specifically, the control system 42 calculates the target trajectory signal $Pd\mathbf{2}_{\alpha}$ by correcting the target trajectory signal $Pd\mathbf{1}_{\alpha}$ by the correction signal $Pff_{out}$, which is the output of the feedforward control unit 42*b*. Then, the target trajectory calculation process A ends.

Figure 12:
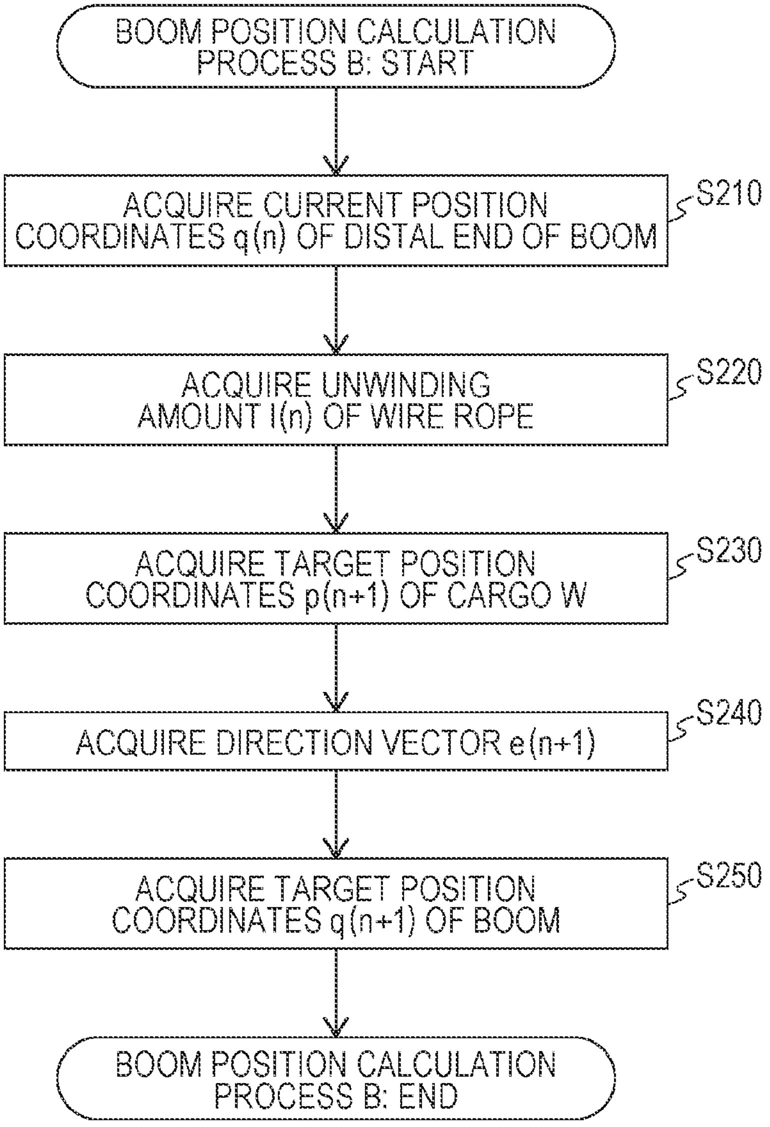
FIG. 12 is a flowchart for describing a crane control process.

In the boom position calculation process B, the control system 42 performs control processing illustrated in FIG. 12.

In step S210, the control system 42 (specifically, the boom position calculation unit 291) acquires the current position coordinates q(n) of the distal end of the boom 204. Specifically, the control system 42 (specifically, the boom position calculation unit 291) calculates the current position coordinates q(n) of the distal end of the boom 204 on the basis of the acquired slewing angle θz(n) of the slewing base 201, telescoping length lb(n), and derricking angle θx(n) of the boom 204.

In step S220, the control system 42 (specifically, the boom position calculation unit 291) acquires the unwinding amount l(n) of the wire rope (the main wire rope 213 or the sub-wire rope 215) suspending the cargo. Specifically, the control system 42 (specifically, the boom position calculation unit 291) calculates the unwinding amount l(n) of the wire rope using Formula (3) described above on the basis of the current position coordinates p(n) of the cargo W and the current position coordinates q(n) of the boom 204.

In step S230, the control system 42 (specifically, the boom position calculation unit 291) acquires the target position coordinates p(n+1) of the cargo W. Specifically, the control system 42 (specifically, the boom position calculation unit 291) calculates the target position coordinates p(n+1) of the cargo W, which are the target position of the cargo W after a lapse of the unit time t, on the basis of the target trajectory signal $Pd2_{\alpha}$ with reference to the current position coordinates p(n) of the cargo W.

In step S240, the control system 42 (specifically, the boom position calculation unit 291) acquires the direction vector e(n+1) of the wire rope. Specifically, the control system 42 (specifically, the boom position calculation unit 291) calculates the acceleration of the cargo W on the basis of the current position coordinates p(n) of the cargo W and the target position coordinates p(n+1) of the cargo W.

Then, the control system 42 (specifically, the boom position calculation unit 291) calculates the direction vector e(n+1) of the wire rope from Formula (4) described above by using the acceleration and the gravitational acceleration of the cargo W.

In step S250, the control system 42 (specifically, the boom position calculation unit 291) acquires the target position coordinates q(n+1) of the boom 204. Specifically, the control system 42 (specifically, the boom position calculation unit 291) calculates the target position coordinates q(n+1) of the boom 204 from Formula (5) described above on the basis of the acquired unwinding amount l(n) of the wire rope and direction vector e(n+1) of the wire rope. Then, the control system 42 (specifically, the boom position calculation unit 291) ends the boom position calculation process B.

Figure 13:
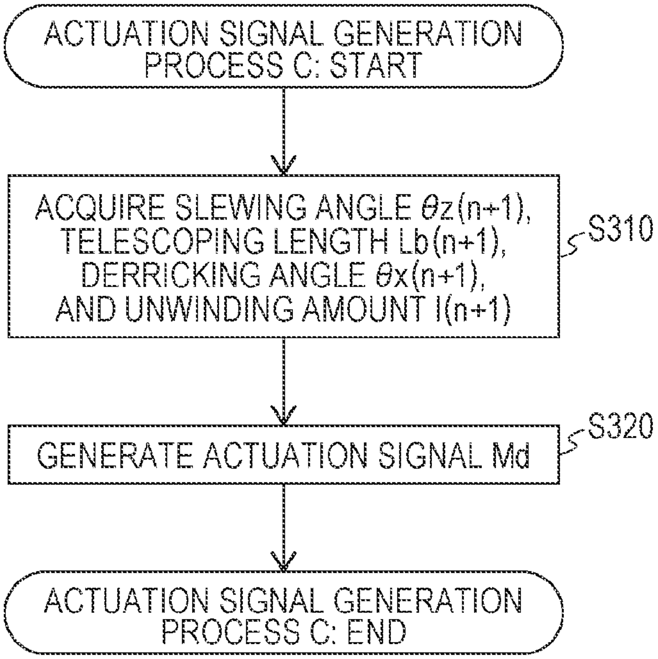
FIG. 13 is a flowchart for describing a crane control process.

In the actuation signal generation process C, the control system 42 performs control processing illustrated in FIG. 13.

In step S310, the control system 42 (specifically, the actuation signal generation unit 292) acquires (calculates) a slewing angle θz(n+1) of the slewing base 201, a telescoping length Lb(n+1), a derricking angle θx(n+1), and an unwinding amount l(n+1) of the wire rope after a lapse of the unit time t on the basis of the target position coordinates q(n+1) of the boom 204.

In step S320, the control system 42 (specifically, the actuation signal generation unit 292) generates the actuation signal Md of the valve.

Specifically, the control system 42 (specifically, the actuation signal generation unit 292) generates the actuation signal Md for controlling the object to be controlled on the basis of the acquired slewing angle θz(n+1), telescoping length Lb(n+1), derricking angle θx(n+1), and unwinding amount l(n+1) of the wire rope.

The actuation signal Md is an actuation signal for operating the valve corresponding to the object to be controlled (each actuator) that needs to be operated to transport the cargo W to the target position coordinates p(n+1).

That is, the actuation signal Md may be regarded as the actuation signal Md of at least one valve that needs to be operated to transport the cargo W to the target position coordinates p(n+1) among the slewing valve 250, the telescoping valve 251, the derricking valve 252, the main drum valve 253, and/or the sub-drum valve 254.

Then, the control system 42 (specifically, the actuation signal generation unit 292) ends the actuation signal generation process C.

The control system 42 of the crane C controls each actuator according to the actuation signal Md generated on the basis of the target position coordinates q(n+1) of the boom 204 by repeating the target trajectory calculation process A, the boom position calculation process B, and the actuation signal generation process C.

(Transmission of Weighting Factor)

Further, in the case of the present embodiment, the control system 42 (the control unit 29) transmits the weighting factor $w_{\alpha}$ (specifically, $w_{\alpha1}$, $w_{\alpha2}$, $w_{\alpha3}$, and $w_{\alpha4}$) of the feedforward control unit 42*b* to the characteristic change determination device 7 at an appropriate timing.

For example, when receiving a request from the characteristic change determination device 7 to be described below, the control system 42 (control unit 29) transmits the weighting factor $w_{\alpha}$ to the characteristic change determination device 7. At this time, the control system 42 (control unit 29) acquires the weighting factor $w_{\alpha}$ from the storage unit 27, for example, and transmits the acquired weighting factor $w_{\alpha}$ to the characteristic change determination device 7.

For example, the control system 42 (control unit 29) transmits the weighting factor $w_{\alpha}$ to the characteristic change determination device 7 every time the weighting factor $w_{\alpha}$ of the feedforward control unit 42*b* is adjusted in step S150 (see FIG. 11) described above.

Further, for example, in a case where the progress of learning in the feedforward control unit 42*b* corresponds to a predetermined condition, the control system 42 (control unit 29) transmits the weighting factor $w_{\alpha}$ to the characteristic change determination device 7.

In a case where the progress of learning corresponds to a predetermined condition, for example, the control system 42 (control unit 29) acquires the weighting factor $w_{\alpha}$ from the storage unit 27 and transmits the acquired weighting factor $w_{\alpha}$ to the characteristic change determination device 7.

The predetermined condition described above is, for example, a case where a variation rate of the weighting factor $w_{\alpha}$ is equal to or less than a predetermined value. Further, the predetermined condition described above is, for example, a case where a variation range of the weighting factor $w_{\alpha}$ is equal to or less than a predetermined value.

(Characteristic Change Determination Device)

Hereinafter, a configuration of the characteristic change determination device 7 will be described. The characteristic change determination device 7 is, for example, a server. As illustrated in FIG. 1, the characteristic change determination device 7 is connected to the crane C via the network N. The characteristic change determination device 7 corresponds to an example of the external device.

Note that it is sufficient if the characteristic change determination device 7 is connected to the crane C by wire or wirelessly. The characteristic change determination device 7 may be provided at a remote place away from the work site of the crane C. Further, the characteristic change determination device 7 may be provided in an area of the work site of the crane C. Further, the characteristic change determination device 7 may be incorporated in the crane C in a state of being capable of communicative connection the crane C.

Such a characteristic change determination device 7 acquires the weighting factor $w_\alpha$ described above from the crane C. Then, the characteristic change determination device 7 has a function of performing calculation using the acquired weighting factor $w_\alpha$. The calculation using the weighting factor $w_\alpha$ includes, for example, various calculations such as display on a display unit 74 described below and determination of a change in the characteristics of the crane C using the weighting factor $w_\alpha$.

Specifically, as illustrated in FIG. 3, the characteristic change determination device 7 includes the communication unit 71, an acquisition unit 72, the storage unit 73, the display unit 74, and a control unit 75.

(Communication Unit)

The communication unit 71 is communicatively connected to the communication unit 28 of the crane C via, for example, the network N such as the Internet. Note that a communication method between the communication unit 71 and the communication unit 28 of the crane C is not particularly limited.

The communication unit 71 establishes communication with the communication unit 28 of the crane C and sends or receives information under the control of the control unit 75. The communication unit 71 sends the information acquired from the communication unit 28 of the crane C to the acquisition unit 72 under the control of the control unit 29.

Specifically, the communication unit 71 acquires the weighting factor $w_\alpha$ from the crane C at a predetermined timing.

(Acquisition Unit)

The acquisition unit 72 acquires the weighting factor $w_\alpha$ from the communication unit 71 under the control of the control unit 75.

(Storage Unit)

The storage unit 73 corresponds to an example of the second storage unit, and stores information under the control of the control unit 75. In the case of the present embodiment, the storage unit 73 stores a reference model in which the characteristics of the object to be controlled (for example, each actuator) in the crane C are expressed (in other words, identified) by the same mathematical model as that of the feedforward control unit 42*b*.

The reference model may be regarded as a model that identifies the object to be controlled in an initial state (in other words, in an unused state or in a normal state) of the crane C. The reference model has, for example, the same configuration as the feedforward control unit 42*b* illustrated in FIG. 9. Thus, the transfer function G(s) of the reference model is the same as that in Formula 6 described above.

The reference model has the weighting factor $w_{\alpha s}$ corresponding to the characteristics of the object to be controlled in the initial state of the crane C. In the case of the present embodiment, the weighting factor $w_{\alpha s}$ of the reference model corresponds to the weighting factors $w_{\alpha 1}$, $w_{\alpha 2}$, $w_{\alpha 3}$, and $w_{\alpha 4}$ in the feedforward control unit 42*b* of the crane C.

(Display Unit)

The display unit 74 displays information under the control of the control unit 75. The display unit 74 is, for example, a display or a monitor.

(Control Unit)

The control unit 75 controls the operation of each element 71 to 74 constituting the characteristic change determination device 7.

The control unit 75 controls the communication unit 71 to transmit a request including information for instructing the crane C to transmit the weighting factor $w_\alpha$ to the crane C, for example, in response to an operation input from the operator of the characteristic change determination device 7. The operator of the characteristic change determination device 7 inputs an operation input via an input unit 76 (for example, a keyboard or a touch panel) provided in the characteristic change determination device 7.

The control unit 75 displays the weighting factor $w_\alpha$ acquired from the crane C on the display unit 74. Specifically, the control unit 75 displays the weighting factor $w_\alpha$ acquired from the crane C on the display unit 74 in time series. Thus, the weighting factor $w_\alpha$ is displayed on the display unit 74 in such an aspect that the operator of the characteristic change determination device 7 can confirm a change in the weighting factor $w_\alpha$, in the learning performed by the feedforward control unit 42*b* of the crane C.

The operator of the characteristic change determination device 7 can determine whether the characteristics of the object to be controlled of the crane C have changed by checking the weighting factor $w_a$ (particularly, the weighting factor $w_\alpha$ at the time point when the learning is completed) displayed on the display unit 74.

That is, as described above, when the characteristics of the object to be controlled in the crane C do not change, the weighting factor for each learning becomes a constant value or a substantially constant value in a state where the learning of the feedforward control unit 42*b* is completed.

On the other hand, in a case where the characteristics of the object to be controlled of the crane C have changed, the weighting factor in a state where the learning is completed is different from the weighting factor before the change in the characteristics of the object to be controlled. That is, the operator of the characteristic change determination device 7 can confirm the presence or absence of the change in the characteristics of the object to be controlled by viewing the change in the weighting factor in a state where the learning is completed.

Further, the control unit 75 may display the weighting factor $w_{\alpha s}$ of the reference model stored in the storage unit 73 on the display unit 74 together with the weighting factor $w_\alpha$ acquired from the crane C. The operator of the characteristic change determination device 7 can determine whether the characteristics of the object to be controlled of the crane C have changed by comparing the weighting factor $w_\alpha$ of the crane C and the weighting factor $w_{\alpha s}$ of the reference model displayed on the display unit 74.

Further, the control unit 75 may have a function of determining whether the characteristics of the object to be controlled of the crane C have changed by comparing the weighting factor $w_\alpha$ (specifically, the weighting factor $w_\alpha$ in a state where the learning is completed in the feedforward control unit 42*b* of the crane C) acquired from the crane C with the weighting factor $w_{\alpha s}$ of the reference model stored in the storage unit 73.

For example, when the difference between the weighting factor $w_\alpha$ acquired from the crane C and the weighting factor $w_{\alpha s}$ of the reference model is smaller than a predetermined value, the control unit 75 determines that the characteristics of the object to be controlled of the crane C have not changed.

On the other hand, when the difference between the weighting factor $w_\alpha$ acquired from the crane C and the weighting factor $w_{\alpha s}$ of the reference model is equal to or more than the predetermined value, the control unit 75 determines that the characteristics of the object to be controlled of the crane C have changed. Then, the control unit 75 may output the above-described determination result (comparison result) (for example, it may be displayed on the display unit 74). Further, the control unit 75 may transmit the above-described determination result to the crane C.

With such a configuration, the operator of the characteristic change determination device 7 and/or the operator of the crane C can easily recognize whether the characteristics of the object to be controlled of the crane C have changed.

Work and Effects of the Present Embodiment

As described above, according to the present embodiment, it is possible to recognize a change in the characteristics of the crane.

The entire disclosure of the specification, drawings, and abstract included in Japanese Patent Application No. 2020-176963 filed on Oct. 21, 2020 is incorporated herein by reference.

INDUSTRIAL APPLICABILITY

The present invention is not limited to a mobile crane, but can be applied to various cranes.

REFERENCE SIGNS LIST

S Characteristic change determination system
C, C1, C2, C3 Crane
W Cargo
1 Vehicle
11 Wheel
12 Engine
13 Outrigger
2 Crane device
201 Slewing base
202 Slewing base camera
**202*f*** Front slewing base camera
**202*r*** Rear slewing base camera
203 Slewing hydraulic motor
204 Boom
205 Jib
206 Boom camera
207 Main hook block
208 Main hook
209 Sub-hook block
210 Sub-hook
211 Derricking hydraulic cylinder
212 Main winch
213 Main wire rope
214 Sub-winch
215 Sub-wire rope
216 Cabin
217 Operation unit
218 Telescoping hydraulic cylinder
219 Main drum hydraulic motor
220 Sub-drum hydraulic motor
230 Slewing operation tool
231 Derricking operation tool
232 Telescoping operation tool
233 Main drum operation tool
234 Sub-drum operation tool
250 Slewing valve
251 Telescoping valve
252 Derricking valve
253 Main drum valve
254 Sub-drum valve
260 Slewing sensor
261 Telescoping sensor
262 Orientation sensor
263 Derricking sensor
27 Storage unit
28 Communication unit
29 Control unit
290 Target trajectory calculation unit
291 Boom position calculation unit
292 Actuation signal generation unit
3 Operation terminal
Housing
31 Suspended cargo moving operation tool
32 Terminal-side slewing operation tool
33 Terminal-side telescoping operation tool
34 Terminal-side main drum operation tool
Terminal-side sub-drum operation tool
36 Terminal-side derricking operation tool
37 Terminal-side display unit
38 Terminal-side control unit
39 Terminal-side orientation sensor
42 Control system
**42*a*** Feedback control unit
**42*b*** Feedforward control unit
43 Winding sensor
7 Characteristic change determination device
71 Communication unit
72 Acquisition unit
73 Storage unit
74 Display unit
75 Control unit
76 Input unit

The invention claimed is:

1. A crane capable of transporting cargo, the crane comprising:

a feedback control unit that performs feedback control of the crane or an object to be controlled that is a component of the crane;

a learning model that has a weighting factor and learns characteristics of the object to be controlled in real time by adjusting the weighting factor on a basis of a teacher signal including a first signal generated by the feedback control unit; and a communication control unit that transmits the weighting factor to a characteristic change determination device that determines a change in the characteristics of the object to be controlled and is communicatively connected to the crane via a network, wherein:

the learning model adjusts the weighting factor on a basis of the teacher signal every time the first signal is generated in the feedback control unit; and the communication control unit transmits the weighting factor to the characteristic change determination device every time the weighting factor is adjusted in the learning model and receives a determination result concerning the change in the characteristics of the object to be controlled from the characteristic change determination device.

2. The crane according to claim 1, wherein the learning model constitutes a feedforward control unit that performs feedforward control of the object to be controlled in cooperation with the feedback control unit.

3. The crane according to claim 1, wherein the object to be controlled is at least one actuator among a slewing actuator for slewing a boom of the crane, a derricking actuator for derricking the boom, a telescoping actuator for telescoping of the boom, and a lifting actuator for lifting a hook of the crane.

4. The crane according to claim 1, comprising:

a plurality of the objects to be controlled; and a plurality of the learning models respectively associated to the objects to be controlled.

5. A crane capable of transporting cargo, the crane comprising:

a feedback control unit that performs feedback control of the crane or an object to be controlled that is a component of the crane;

a learning model that has a weighting factor and learns characteristics of the object to be controlled in real time by adjusting the weighting factor on a basis of a teacher signal including a first signal generated by the feedback control unit;

a communication control unit that transmits the weighting factor to a characteristic change determination device that determines a change in the characteristics of the object to be controlled and is communicatively connected to the crane via a network; and a first storage unit for storing the weighting factor, wherein the first storage unit stores the weighting factor every time the weighting factor is adjusted, and the communication control unit acquires the weighting factor stored in the first storage unit and transmits the weighting factor to the characteristic change determination device, at a predetermined timing and receives a determination result concerning the change in the characteristics of the object to be controlled from the characteristic change determination device.

6. A crane characteristic change determination device communicatively connected, via a network, to a crane according to claim 1, the crane characteristic change determination device comprising:

an acquisition unit that acquires the weighting factor from the crane;

a second storage unit that stores a reference model that is a mathematical model in which characteristics of the object to be controlled at a normal time are learned; and a control unit that determines whether the characteristics of the object to be controlled in the crane have changed by comparing the weighting factor acquired from the acquisition unit with the weighting factor in the reference model and transmits the determination result to the crane.

7. The crane characteristic change determination device according to claim 6, further comprising a display unit configured to be capable of displaying information, wherein the control unit causes the display unit to display a result of the comparison between the weighting factor acquired from the acquisition unit and the weighting factor in the reference model.

8. A crane characteristic change determination system comprising:

a crane according to claim 1; and a characteristic change determination device according to claim 6.

* * * * *